(12) United States Patent
Schlanger

(10) Patent No.: US 9,446,626 B2
(45) Date of Patent: Sep. 20, 2016

(54) VEHICLE WHEEL HUB ASSEMBLY

(71) Applicant: Raphael Schlanger, Wilton, CT (US)

(72) Inventor: Raphael Schlanger, Wilton, CT (US)

( * ) Notice: Subject to any disclaimer, the term of this patent is extended or adjusted under 35 U.S.C. 154(b) by 371 days.

(21) Appl. No.: 13/914,490

(22) Filed: Jun. 10, 2013

(65) Prior Publication Data
US 2013/0270893 A1 Oct. 17, 2013

Related U.S. Application Data

(63) Continuation-in-part of application No. 12/655,433, filed on Dec. 30, 2009, now Pat. No. 8,485,335.

(51) Int. Cl.
*B60B 27/02* (2006.01)
*B62K 25/02* (2006.01)

(52) U.S. Cl.
CPC ............. *B60B 27/026* (2013.01); *B62K 25/02* (2013.01); *B60B 2900/113* (2013.01)

(58) Field of Classification Search
CPC .... B60B 27/023; B60B 27/026; B62K 25/02
See application file for complete search history.

(56) References Cited

U.S. PATENT DOCUMENTS

| | | | | |
|---|---|---|---|---|
| 4,400,038 A | * | 8/1983 | Hosokawa | ................. 301/124.2 |
| 6,089,675 A | | 7/2000 | Schlanger | |
| 6,374,975 B1 | * | 4/2002 | Schlanger | ........................ 192/64 |
| 6,435,622 B1 | * | 8/2002 | Kanehisa | ............ B60B 27/0005 301/110.5 |
| 7,191,884 B2 | * | 3/2007 | Kanehisa et al. | ................ 192/64 |
| 7,360,952 B2 | * | 4/2008 | Kanehisa et al. | ............. 384/545 |
| 7,530,645 B2 | * | 5/2009 | Takachi | ..................... 301/124.2 |
| 7,628,416 B2 | * | 12/2009 | Hara | ............................ 280/260 |
| 7,648,211 B2 | * | 1/2010 | Watarai | ..................... 301/110.5 |
| 7,654,548 B2 | * | 2/2010 | Kanehisa et al. | ............. 280/279 |
| 7,669,871 B2 | * | 3/2010 | Watarai | ......................... 280/279 |
| 8,042,881 B2 | * | 10/2011 | Inoue et al. | ................ 301/124.2 |
| 2002/0067068 A1 | * | 6/2002 | Kanehisa et al. | .......... 301/110.5 |
| 2007/0052285 A1 | * | 3/2007 | Montague et al. | ........ 301/124.1 |
| 2008/0185907 A1 | * | 8/2008 | Hara et al. | ............... 301/111.03 |
| 2008/0284127 A1 | * | 11/2008 | Watarai | .................. B62K 25/02 280/279 |

* cited by examiner

*Primary Examiner* — Kip T Kotter

(57) ABSTRACT

A vehicle wheel hub assembly comprising an axle element that is rotationally stationary about an axial axis, and a hub shell element rotatable about the axle element, including a first end portion and a second end portion axially spaced from said first end portion. The axle element includes a control shaft that is axially displaceable relative to the hub shell element between an axially extended position and an axially retracted position. The control shaft includes an engagement end and a control end. In the extended position, the engagement end is axially distal from the second end portion and, in the retracted position, the engagement end is axially proximal to the second end portion relative to said extended orientation. Including a releasable axial retaining means to control the axial movement of the control shaft relative to the hub shell.

43 Claims, 12 Drawing Sheets

VEHICLE WHEEL HUB ASSEMBLY

CROSS-REFERENCE TO RELATED APPLICATION

This application claims priority of U.S. patent application Ser. No. 12/655,433, filed Dec. 30, 2009, and entitled "TORQUE COUPLING ASSEMBLY".

BACKGROUND

1. Field of the Invention

The present invention relates to a vehicle wheel hub assembly including a rotatable hub shell rotatable about an axial axis and a stationary axle. The axle includes a control shaft that is axially displaceable relative to the hub shell, including a retaining means to control the axial position of the control shaft relative to the hub shell. Preferably, the control shaft is separate from and coaxial to the axle and preferably the control shaft is rotatable relative to the axle.

2. Discussion of Prior Art

U.S. Pat. No. 6,089,675 describes a vehicle (i.e. bicycle) wheel hub that includes a control shaft that is internally coaxial with an axle. As illustrated in FIGS. 4a-f of this patent, the control shaft is axially displaceable relative to the axle, however, there is no means to control the position of this control shaft with respect to the axle or hub shell. This creates significant inconvenience when attempting to assemble this hub assembly to the dropouts of the frame. The control shaft is biased by a spring requiring that the operator manually position the control shaft in the axially retracted orientation to provide sufficient clearance with the dropouts to permit assembly. To assemble the hub to the dropouts, the operator must continuously to hold the control shaft in its axially retracted position and resist the bias of the spring. Simultaneously, the operator must position and pre-assemble the wheel between the dropouts. Additionally, the operator must simultaneously support and align the bicycle frame to permit this assembly. The task of completing these three manual operations simultaneously is quite difficult and clumsy and requires considerable skill and dexterity on the part of the operator. Most often, the operator will attempt to align the wheel (i.e. the hub) and/or the bicycle (i.e. the dropouts) by some external means during this assembly.

Further, even if the control shaft were not biased by a spring, control shaft would then be free to easily slide axially relative to the axle and would freely flop back and forth depending on the position and movement of the wheel during this assembly. This would provide even less control and predictability on the axial position of the control shaft, adding further difficulty for the operator that is attempting to assemble the wheel to the dropouts.

The difficulty for the operator when attempting to assemble the wheel to the dropouts is again repeated when the operator attempts to subsequently disassemble or remove the wheel from the dropouts.

Accordingly, it is an objective of the present invention to overcome the forgoing disadvantages and provide an improved vehicle wheel hub assembly, particularly as applied to a bicycle wheel.

SUMMARY OF THE INVENTION

Objects And Advantages

In accordance with the present invention, it has now been found that the forgoing objects and advantages may be readily obtained.

It is an object of the present invention to provide a vehicle wheel hub assembly that reduces the difficulty and the high degree of skill and dexterity required when assembling the vehicle wheel to the vehicle. It is a further object of the present invention to reduce the difficulty and the high degree of skill and dexterity required when disassembling and removing the vehicle wheel from the vehicle.

The present invention provides a means for predictably controlling the axial position of the control shaft relative to the hub shell during the procedure when assembling the vehicle wheel to the vehicle. The present invention further provides a means for predictably controlling the axial position of the control shaft relative to the hub shell during the procedure when disassembling and removing the vehicle wheel from the vehicle. The present invention has particular utility in applications where the vehicle is a bicycle and where the vehicle wheel is a bicycle wheel.

The present invention obtains many advantages. It is an advantage of the present invention that the level of skill and dexterity is reduced when assembling the wheel to the dropouts and/or when disassembling the wheel from the dropouts. By controlling the axial position of the control shaft, the operator may selectively position and retain the control shaft in the retracted orientation prior to assembling the bicycle wheel to the dropouts. With the axial position of the control shaft retained, both hands of the operator are free to support the bicycle (i.e. the dropouts) while positioning wheel into alignment with the dropouts. Once the wheel is properly positioned, the operator may selectively release the control shaft from its retracted position, permitting the control shaft and the wheel to be manually secured to dropouts. Similarly, the reverse of this process may be employed when uninstalling or removing the wheel from the dropouts. While the present invention may serve to axially retain the control shaft in the retracted position, such a retaining means may alternatively or additionally serve to axially retain the control shaft in a variety of axial positions, including the extended position.

The means to control the axial position of the control shaft relative to the hub shell may be achieved by a yieldable retaining means that serves to retain the control shaft in a specific axial position or within an axial positional range. The control shaft may be simply manually displaced relative to the hub shell to the desired axial position such that the retaining means is engaged and serving to retain and/or hold the control shaft in this position. This is achieved by a yieldable detent mechanism and/or a mechanical engagement means and/or a gripping retaining means and/or a magnetic retaining means and/or a variety of other retaining means to provide similar function. The control shaft may be subsequently manually displaced with additional axial force to override and yield or otherwise release this retaining means, permitting the control shaft to be axially released or axially displaced to a second axial position.

Alternatively, the means to control the axial position of the control shaft relative to the hub shell may be achieved by a lockable retaining means that serves to retain the control shaft in a specific axial position or within a positional range. The control shaft may be manually displaced relative to the hub shell to the desired axial position and a locking mechanism is also engaged to axially lock and retain the control shaft in this axial position. The locking mechanism may be subsequently released to permit the control shaft to be axially released or axially displaced to a second axial position.

The present invention serves to provide axial positioning control of the control shaft as described, which serves to reduce the number of simultaneous operations that the operator must perform while assembling the wheel to the dropouts of the bicycle. This makes this assembly and removal procedure much simpler and easier to perform and reduces the level of skill and dexterity required when assembling the wheel to the dropouts and/or removing the wheel from the dropouts.

Further objects and advantages of my invention will become apparent from considering the drawings and ensuing description.

BRIEF DESCRIPTION OF THE DRAWINGS

The present invention will be more readily understandable from a consideration of the accompanying drawings, wherein:

FIG. 2c shows the adapter and nut assembled to one dropout and the hub assembly axially aligned in preparation for assembly with the dropouts, and with the control shaft axially retained in the retracted position;

FIG. 2d shows the hub assembly positioned between the dropouts, with each axlecap radially nested within its respective adapter and slot, and with the control shaft still in the retracted position;

FIG. 2e shows the hub assembly positioned between the dropouts, with the control shaft in an axially extended orientation and threadably engaged with the adapter to secure the hub assembly to the dropouts;

FIG. 2f shows the hub assembly as positioned in FIG. 2e, with the handle pivotally folded;

FIG. 2g shows the hub assembly positioned between the dropouts, with the control shaft axially retained in the retracted position, corresponding to the assembly sequence described in FIG. 2d;

FIG. 2h shows the hub assembly positioned between the dropouts, with the control shaft axially released and advanced to the pre-engaged position, corresponding the final portion of the assembly sequence described in FIG. 2d;

FIG. 2i shows the hub assembly positioned between the dropouts, with the control shaft in an axially extended orientation and threadably engaged with the dropout adapter, and with the handle pivotally folded, corresponding to the assembly sequence described in FIG. 2f;

FIG. 4b is an axial cross section detail view, corresponding to the assembly sequence of FIG. 2n, of the embodiment of FIG. 4a;

DETAILED DESCRIPTION OF THE INVENTION

Figure 1:
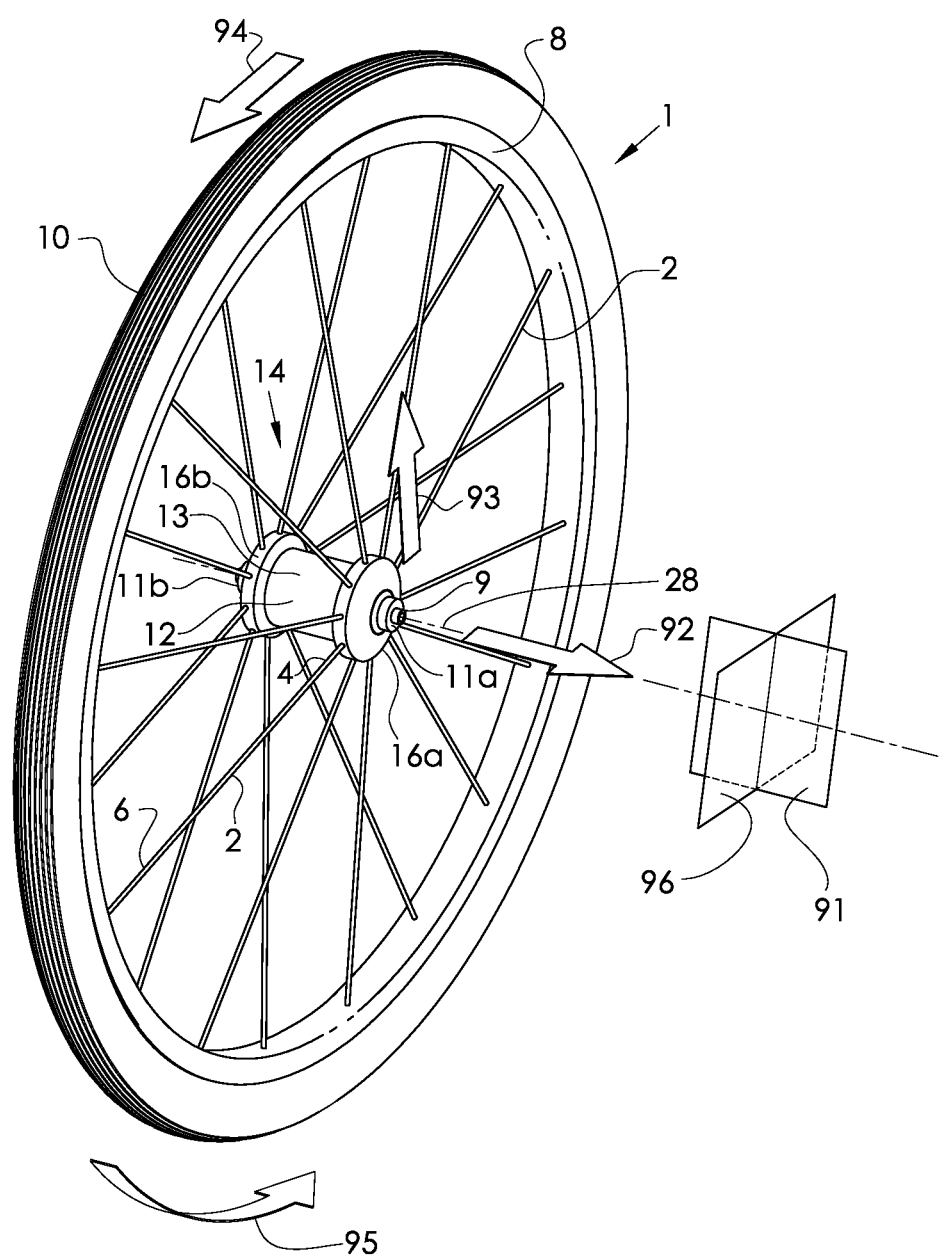
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. The hub assembly 14 includes a rotatable hub shell 12 and a stationary axle 9, with bearings (not shown) to facilitate rotation of the hub shell 12 about the axial axis 28. The hub shell 12 includes a hub body 13 with at least two axially spaced hub flanges 22a and 22b, each of which include a means for connecting with the spokes (not shown). The axle 9 includes end faces 11a and 11b to interface with the dropouts (not shown). The axial axis 28 is the axial centerline of rotation of the bicycle wheel 1. The hub flanges 22a and 22b may be contiguous with the hub shell 12 or may be separately formed and assembled to the hub body 13 portion of the hub shell 12. The spokes 2 are affixed to the hub flanges 22a or 22b at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is a direction parallel with the axial axis 28. The radial direction 93 is a direction generally perpendicular to the axial direction 92 and extending generally from the axial axis 28 radially outwardly toward the rim 8. The tangential direction 94 is a direction perpendicular to both the radial direction 93 and axial direction 92, defining a generally tangent vector at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 91 is a plane that is generally parallel to the axial axis.

In the ensuing descriptions, the term "axial" refers to a direction parallel to the centerline of the axial axis and the term "radial" refers to a direction perpendicular to the axial axis. An axially inboard (or inward) orientation is an orientation that is axially proximal to the axial midpoint between the two end faces 11a and 11b. Conversely, an axially outboard (or outward) orientation is an orientation that is axially distal to the axial midpoint between the two end faces 11a and 11b. A radially inboard (or inward) orientation is an orientation that is radially proximal to the axial axis 28 and a radially outboard (or outward) orientation is an orientation that is radially distal to the axial axis 28. An axially inboard (or inward) facing surface is a surface that faces toward the axial midpoint between the two end faces 11a and 11b. Conversely, an axially outboard (or outward) facing surface is a surface that faces away from the axial midpoint between the two end faces 11a and 11b.

While it is most common for the hub shell 12 to rotate about a fixed axle 9, there are some cases where it is desirable to permit the axle 9 to be fixed with the wheel 1 such as the case where the wheel 1 is driven by the axle 9.

For general definition purposes herein, an "integral" joinder or assembly is one that is integrated and may not be easily disassembled at the service temperature without damaging at least one of the components that are joined, or is difficult to disassemble, or is otherwise not meant to be disassembled. This integral joinder involves a joining interface directly between two components. This joining interface is often a welded or adhered interface or some other interface where the two joining surfaces are solidly joined to each other to create a unified structure. Preferably this joining interface is a surface interface, rather than a point or edge interface. The integral joinder is in contrast to a fastened joinder, where such a fastened joinder relies solely on a mechanically interlocked engagement to secure or connect the two components to each other. The term "integral" refers to two portions that are unitary, and/or integrally joined. Further, when two portions are considered "monolithic" with each other, they may be considered to be integrally and monolithically combined as a singular element.

Figure 2A:
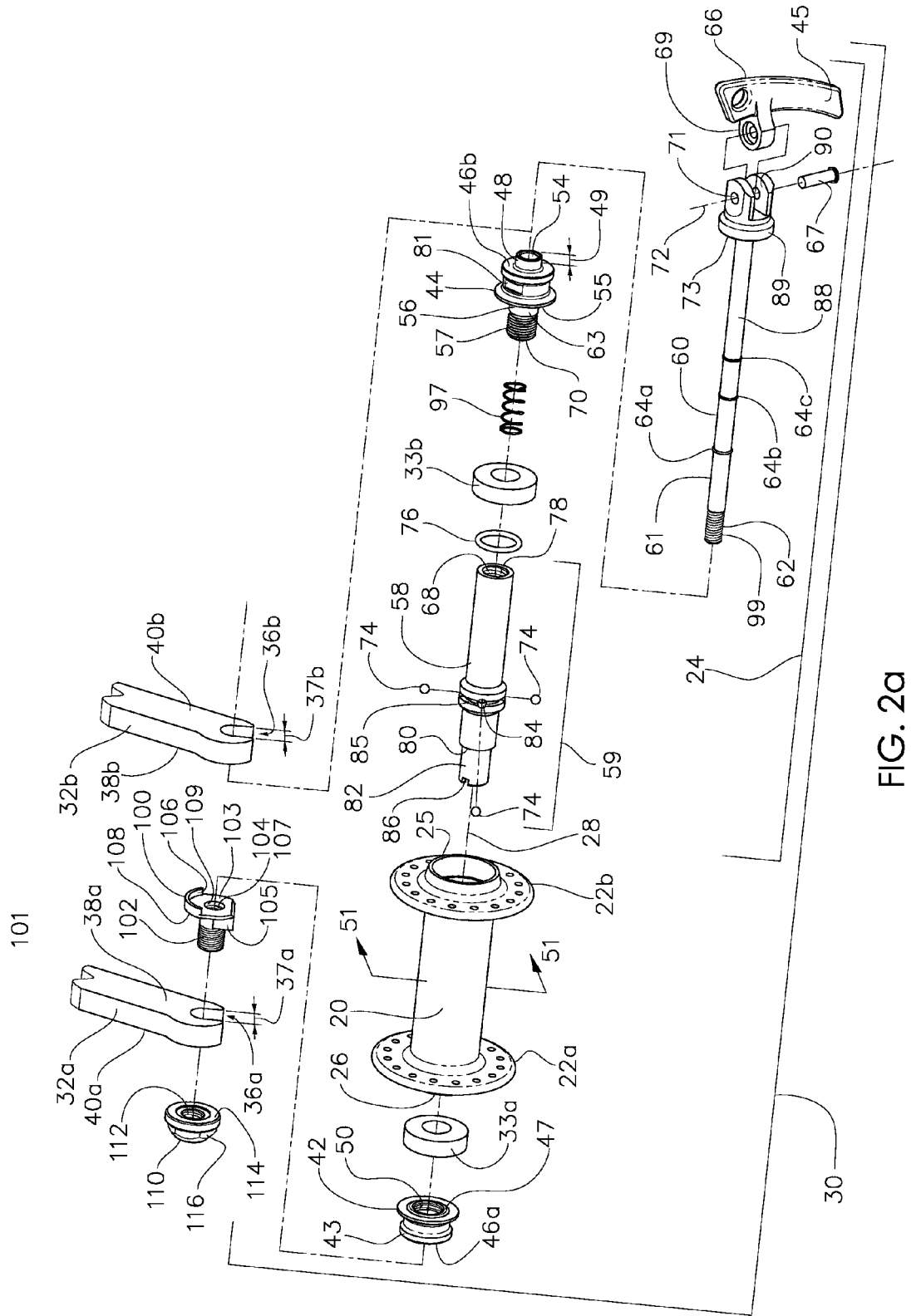
FIG. 2a is an exploded perspective view of a first embodiment of the present invention, showing the dropouts of the bicycle frame and a hub assembly, including a control shaft assembly, with detent balls axially retained in the axle and a raised detent camming surface of the control shaft.

FIGS. 2a-m describe an embodiment of the present invention that illustrates a spring-energized yieldable linear detent mechanism that may be passively engaged to retain the control shaft assembly in a retracted position relative to the hub shell 20 and relative to dropouts 32a and 32b. FIG. 2a is an exploded view, showing the individual components of this embodiment.

Referring to FIG. 2a, dropouts 32a and 32b may be considered mounting portions of the bicycle (not shown) and constitute the portion of the frame (not shown) to which the hub assembly 30 is mounted or connected. Dropout 32a includes open slot 36a with slot width 37a, axially inboard face 38a, and axially outboard face 40a. Similarly, dropout 32b includes open slot 36b with slot width 37a, axially inboard face 38b, and axially outboard face 40b. Inboard faces 38a and 38b are axially opposed and face each other, while outer faces 40a and 40b are axially opposed and face away from each other. Slot widths 37a and 37b are sized to accept the corresponding adapter 100 and axle stub 48 respectively. The dropouts 32a and 32b shown here are more typical of the front dropouts of a bicycle frame, but the rear dropouts may be similar in design and it is understood that this design is representative of a wide range of dropout designs, either conventional or unconventional.

The hub assembly 30 includes an axle assembly 24 (and also including axlecap 42) and a hub shell 20. In this case, the axle assembly 24 is generally stationary and fixed to the frame of the bicycle, while the hub shell 20 is rotatable about axial axis 28 and about the axle assembly 24 by means of bearing assemblies 33a and 33b. Bearing assemblies 33a and 33b are shown here as conventional "cartridge" type bearing assemblies, including rolling elements, an inner race and an outer race. The hub shell 20 includes two hub flanges 22*a* and 22*b* that are adapted to connect with the first ends of spokes (not shown). Hub shell 20 includes a second end portion 25 axially disposed to be proximal to handle 66 of the control shaft assembly 60 and to outer face 46*b*, and a first end portion 26 axially disposed to be distal the handle 66 relative to the second end portion 25 and to be axially proximal outer face 46*a*. The axle assembly 24 includes axlecap 42, axlecap 44, sleeve assembly 59, and control shaft assembly 60. The sleeve assembly 59 includes sleeve 58, detent balls 74, and elastomeric o-ring 76. The control shaft assembly 60 includes the control shaft 61 with snaprings 64*a-c*, handle 66, and pivot pin 67. The handle 66 includes a radially projecting lever portion 45 to afford additional tightening torque and leverage when the handle 66 is manipulated by the operator.

Figure 2B:
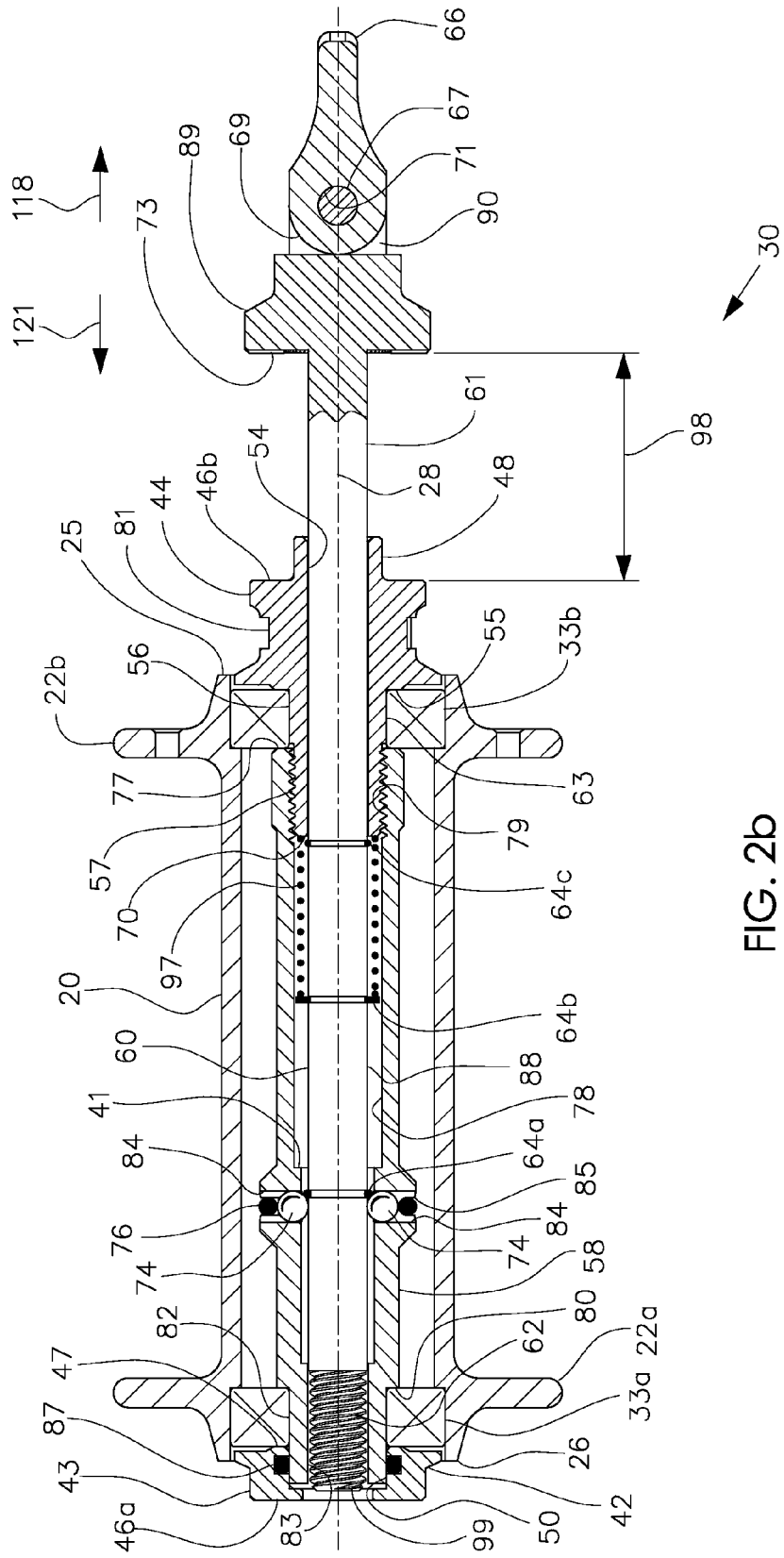
FIG. 2b is an axial cross-sectional view taken along 51-51 of the hub assembly of the embodiment of FIG. 2a, with the control shaft axially retained with the sleeve and positioned in the axially retracted orientation.

For explanation purposes and referring to FIGS. 2*a-b*, it is understood that an orientation described as "toward the handle" or "handle end" refers to an axial location proximal to the handle 66 and distal the end portion 99. Conversely, an orientation described as "engagement end" refers to an axial location proximal to the end portion 99 and distal the handle 66. The sleeve 58 includes an axial opening 78 therethrough, with internal threads 79 and end face 77 at its handle end. Sleeve 58 also includes shoulder 80, collar 82, and hole 83 at its engagement end that is sized to accept the control shaft 61. Sleeve 58 also includes radial holes 84, each sized to accept a mating detent ball 74 and a circumferential groove 85 that is axially aligned with radial holes 84 and sized to receive and retain the o-ring 76. It is preferable that the o-ring 76 be circumferentially stretched slightly to fit within groove 85. This stretch serves as a radial inward preload to the detent balls 74.

Axlecap 44 includes outer face 46*b*, shoulder 55, axle stub 48, collar portion 56, end face 70, and an axially extending hole 54 therethrough. Axlecap 44 also includes flats 81 for rotational manipulation with a wrench (not shown). Collar portion 56 includes a threaded portion with external threads 57 to mate with internal threads 68 of the sleeve 58 and a smooth cylindrical portion 63 to pilot the inside diameter of bearing 33*b*.

Holes 50 and 54 constitute the exposed openings of a continuous axial hole that extends through the axle assembly 24 to accept the control shaft 60. The diameter 49 of stub 48 is sized to easily fit within slot 36*b* and to provide radial positioning alignment between the hub assembly 30 and the dropout 32*b* when it is nested within slot 36*b*. Axlecap 42 includes axially extending hole 50 sized to accept collar 82, end face 46*a*, shoulder 47 and cylindrical alignment surface 43. Outer faces 46*a* and 46*b* are generally axially opposed and face away from each other.

Adapter 100 includes externally threaded collar 102, flats 105, hole 104, shoulder 108, end face 103, and a concave alignment surface 106. Hole 104 includes a counterbore 109 portion that extends axially from end face 103 through a portion of hole 104 and is of a diameter sized to accept the major diameter of external threads 62 of the control shaft 61. Hole 104 also includes an internally threaded portion with internal threads 107 extending axially from the base of the counterbore 109 through the remainder of the collar 102. Internal threads 107 are sized to threadably mate with external threads 62 of the control shaft 61. Flats 105 are sized to engage with the slot 36*a* and prevent the adapter 100 from rotating with the nut 110 during assembly with dropout 32*a*. The engagement between flats 105 and slot 36*a* also serve to maintain the proper alignment of the adapter 100 about the axial axis 28. Nut 110 includes internally threaded hole 112, end face 114, and flats 116. The adapter 100 is first pre-assembled to dropout 32*b* such that collar 102 and flats 105 are nested within slot 36*a* to extend therethrough, with shoulder 108 axially abutting inboard face 38*a*. Nut 110 is then threaded to adapter 100 with internal threads of hole 112 threadably mated to external threads of collar 102, such that end face 114 is axially abutting outboard face 40*a*. The nut 110 is further threadably tightened against the adapter 110, by means of a wrench (not shown) engaged to flats 116 to sandwich and grip the dropout 32*a*, with end face 114 bearing and gripping against outboard face 40*a* and shoulder 108 bearing and gripping against inboard face 38*a*.

As shown in FIG. 2*b*, which corresponds to the retracted and retained position of the control shaft 61, detent balls 74 are positioned in their corresponding radial holes 84 with o-ring 76 positioned in circumferential groove 85. O-ring 76 serves to bear against detent balls 74 to bias them radially inwardly within radial holes 84. Shoulder 80 axially abuts the inner race of bearing assembly 33*a* and end face 77 axially abuts the inner race of bearing assembly 33*b*. Outer races of bearing assemblies 33*a* and 33*b* are radially and axially fixed in the hub shell 20 in the conventional manner as shown. Thus, sleeve 58 is axially fixed relative to the hub shell 20, with the hub shell 20 rotatable about the sleeve 58 and about the axial axis 28. Axlecap 44 is threadably assembled to the sleeve 58 as shown, with external threads 57 mated to internal threads 79 and with shoulder 55 axially abutting the inner race of bearing assembly 33*b*. End face 77 and shoulder 55 serve to axially sandwich and locate the inner race of bearing assembly 33*b*. Collar portion 56 extends through the inner race of bearing assembly 33*b*. Similarly, collar 82 extends through the inner race of bearing 33*a* and within hole 50 to also pilot the axle cap 42. Shoulder 80 and shoulder 47 serve to axially sandwich and locate the inner bearing race of bearing assembly 33*a*. The opening 78 of sleeve 58 is stepped from a larger diameter adjacent the handle end for clearance with spring 97 to the smaller diameter of hole 83 adjacent the engagement end for radial piloting of the control shaft 61. Sleeve 58 also includes notches 86 at the engagement end for rotational manipulation with a mating wrench (not shown) about the axial axis 28. The assembled axle assembly 24 preferably provides a fixed axial distance between outer faces 46*a* and 46*b* as is conventional.

Concentric and coaxial within the sleeve 58 is the control shaft 61, which is both (axially) slideable and rotatable within the sleeve 58 about the axial axis 28. Control shaft 61 includes a shank portion 88 and an enlarged head portion 89. The head portion 89 includes an grip face 73, a slot 90 to accept the pivot tab 69 of the handle 66, and a cross hole 71 sized to accept the pivot pin 67. Control shaft 61 includes a shank portion 88 that extends through axlecaps 42 and 44 and sleeve 58 and includes end portion 99 with external threads 62 at its engagement end and three snaprings 64*a*, 64*b*, and 64*c*, each nested and engaged in corresponding circumferential snapring grooves, at specific axial locations along its length. Snapring 64*a* provides a raised detent camming surface relative to the shank portion 88 to interface with detent balls 74 and to provide detent action. Snapring 64*b* provides an end stop for compression spring 97, which is positioned between snapring 64*b* and end face 70, and which serves to axially bias the control shaft 61 toward the engagement end relative to the sleeve 58.

Snapring 64*c* provides an axial displacement limit stop relative to the axle assembly 24. In the case where the control shaft assembly 60 is withdrawn too far in direction 118, the snapring 64*c* will abut end face 70 and limit its travel. A such, snapring 64*c* also serves to insure that the control shaft is positively retained with the axle assembly 24, serving as a convenience to prevent the control shaft assembly 60 from becoming separated from the hub assembly 30. The control shaft 61 also includes head portion 89 with grip face 73, slot 90, and cross hole 71. The pivot tab 69 of the handle 66 is assembled to the head portion 89 by first inserting pivot tab 69 into slot 90 and then inserting pivot pin 67 through cross hole 71 such that the handle 66 is engaged to the head portion 89 in a clevis hinge arrangement. The handle 66 may now be pivoted about the pivot axis 72 relative to the control shaft 61.

FIG. 2*b* shows the assembled hub assembly 30, with the handle 66 assembled to the control shaft 61 by means of pin 67. The handle 66 is shown to be pivoted to its open or unfolded position and is ready for manual manipulation. The bearings 33*a* and 33*b* are assembled to the hub shell 20, with the sleeve 58 positioned with shoulder 80 and end face 77 abutting their respective inner races. Control shaft 61 is extending through hole 54 and with spring 97 constrained between end face 70 and snapring 64*b*. Axlecap 44 is threadably assembled to the sleeve 58 as described above. This threadable assembly may be tightened with the aid of wrenches (not shown) engaged with flats 81 and notches 86 to axially sandwich the inner race of bearing assembly 33*b*. A portion of collar 82 protrudes through bearing 33*a* to radially pilot the hole 50 of axlecap 42, with o-ring 87 providing a frictionally gripped retaining between the two in the conventional manner.

Detent balls 74 are assembled within their respective holes 84 and advanced radially inwardly therethrough until they approach or lightly contact the shank portion 88. O-ring 76 is then expanded and placed in groove 86 such that it circumferentially wraps around the radially outboard portion of the detent balls 74. The stretched o-ring 76 serves as a hoop spring to bias the detent balls 74 radially inwardly within their holes 84. The compression spring 97 surrounds the control shaft 61, with its ends braced between the snapring 64*b* of the control shaft 61 and the end face 70 of the axlecap 44. With the control shaft assembly 60 in the retracted position, as shown in FIGS. 2*b*-*c*, the compression spring 97 is axially compressed and pre-loaded to provide a bias force to axially shuttle the control shaft assembly 60 in direction 121 towards the extended position shown in FIG. 2*e* and 2*i*.

Figure 2C:
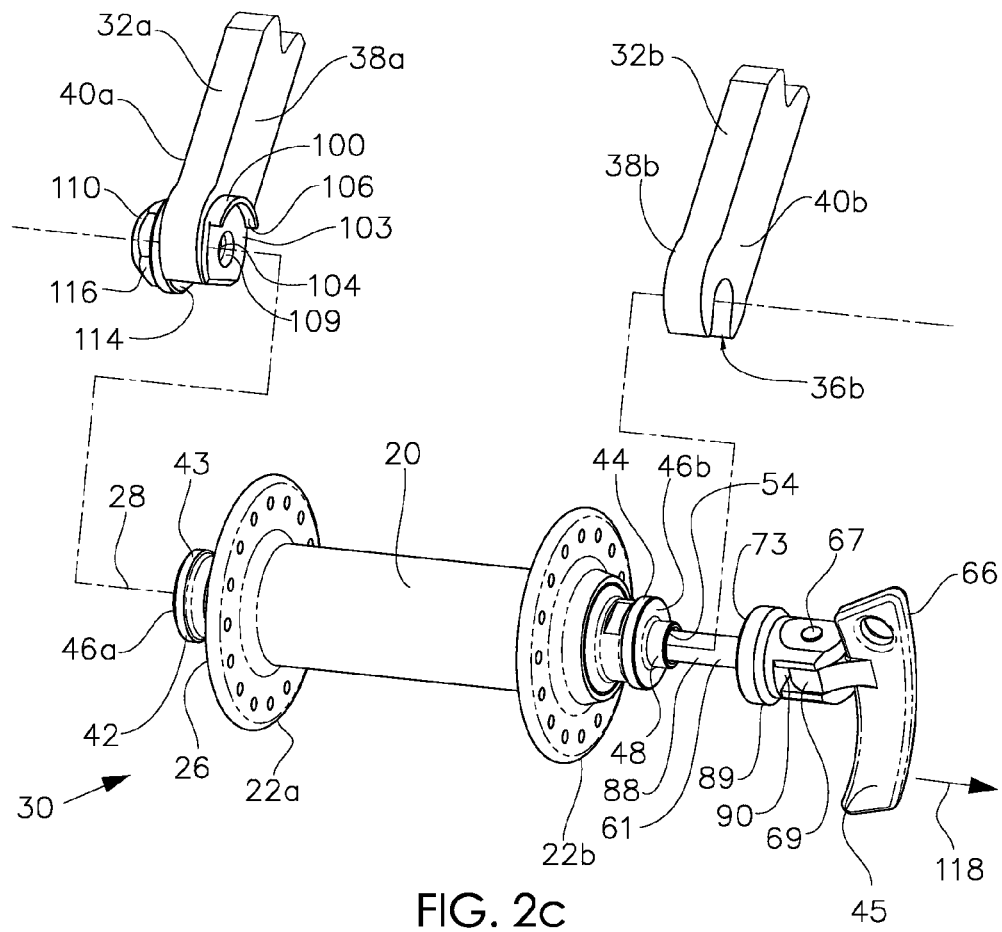
FIGS. 2c-f are perspective views of the embodiment of FIG. 2a, showing the progressive sequential assembly steps involved in assembling the hub assembly to the dropouts.

The control shaft 61 is shown in FIGS. 2*b*-*c* to be retained in the axially retracted position relative to the sleeve 58 and axle assembly 24. The control shaft assembly 60 has been axially withdrawn toward the handle end in direction 118 until snapring 64*c* contacts the end face 70 and snapring 64*a* is on the handle side of detent balls 74. This retracted position causes the spring 97 to be compressed to axially bias the control shaft assembly 60 in direction 121. Snapring 64*a* provides a radially raised circumferential detent camming surface relative to the comparatively radially relieved surface of the shank portion 88 and snapring 64*a* is biased by the spring 97 in direction 121 to axially press against the detent balls 74. The cam action of the snapring 64*a* provides a radially outward force to the detent balls 74, inducing them to move radially outwardly within their holes 84. However, the radially inward hoop force of the o-ring 76 against the detent balls 74 serves to counteract this radially outward force and thus maintains the radially inward position of these detent balls 74, thereby restricting the control shaft assembly 60 from advancing in direction 121 and thus retaining and maintaining the retracted axial position of the control shaft assembly 60 as shown. In this retracted position, the axial gap 98 between outer face 46*b* and grip face 73 is considered "open" and is larger than the axial width between inboard face 38*b* and outboard face 40*b* of dropout 32*b*. The interaction between the snapring 64*a*, the detent balls 74, the holes 84 and the o-ring 76 may be considered as a detent mechanism to retain the axial position of the control shaft assembly 60 at a predetermined axial location relative to the sleeve 58. Additionally, in this retracted position, the end portion 99 of the control shaft assembly 60 is also shown to be slightly axially recessed relative to the outer face 46*a*, as dictated by the axial positional arrangement of this detent mechanism. It is noted that, in the retracted position, there is a small axial gap between snapring 64*c* and end face 70, which permits a correspondingly small amount of axial overtravel of the control shaft assembly 60 in direction 118.

FIG. 2*c* shows adapter 100 and nut 110 as firmly assembled to grip the dropout 32*a* as described hereinabove. Once firmly secured to the dropout 32*a*, the adapter 100 may be considered as an extension of the dropout 32*a*. The hub assembly 30 is shown positioned prior to its assembly with the dropout 32*b* and adapter 100. The handle 66 is in its unfolded and open position. The operator has pulled the handle 66 in direction 118 to insure that the control shaft assembly 60 is in the retracted position, with gap 98 open and expanded and with the engagement end of the control shaft assembly 60 recessed from outer face 46*a*. The handle 66 serves to provide geometry for the operator to easily manipulate and control the control shaft assembly 60 as described herein. The retracted position is maintained, against the axial bias of spring 97, by the axial detent mechanism as described herein. As a convenience and to prevent the operator from retracting the control shaft assembly 60 too far in direction 118, snapring 64*c* is provided to bear against the end face 70 of the axlecap 44 as a positive axial travel limit stop. It is noted that, as shown in FIGS. 2*a*-*q*, the control shaft assembly 60 is axially retained and engaged to the hub assembly 30 such that the control shaft assembly 60 may not be inadvertently removed from the hub assembly 30.

Figure 2D:
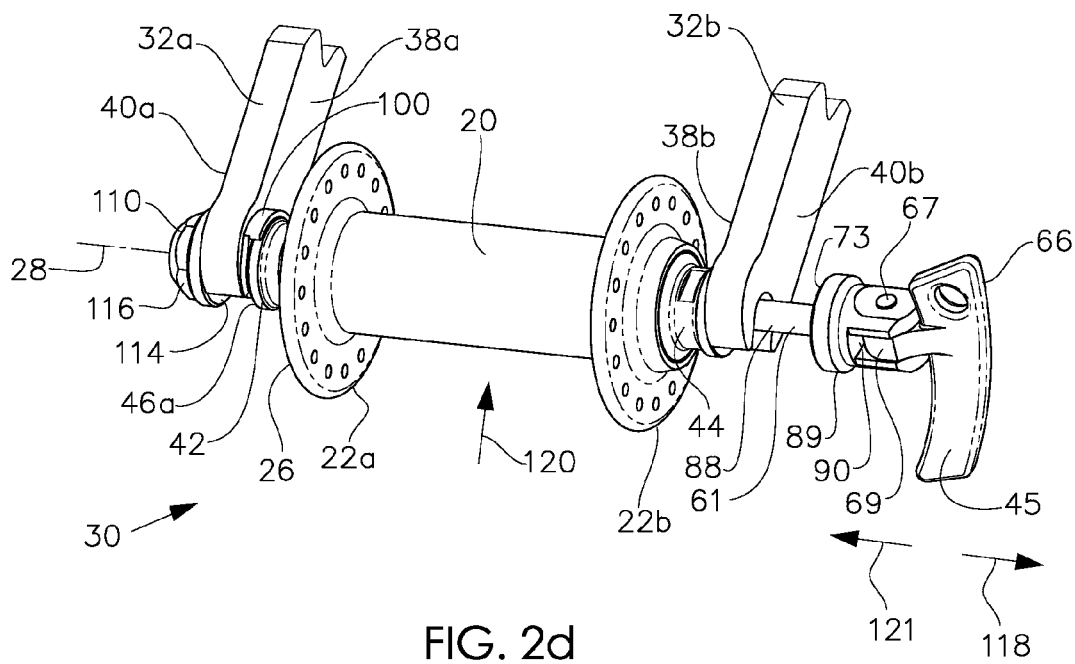

Next, as shown in FIG. 2*d*, the hub assembly 30 is moved in the generally radial direction 120 relative to the dropouts 32*a* and 32*b* such that the stub 48 is radially nested within slot 36*b* in the conventional manner and the cylindrical alignment surface 43 of axlecap 42 is radially nested with alignment surface 106. These nested engagements serve to provide a radial depth stop of the hub assembly 30 relative to the dropouts 32*a* and 32*b*. Outer face 46*a* is adjoining end face 103 and outer face 46*b* is adjoining inboard face 38*b*. The external threads 62 are now radially aligned with internal threads 107.

Next, as also shown in FIG. 2*d*, the operator has manually pushed the handle 66 in direction 121 to axially press the control shaft assembly 60 and snapring 64*a* in direction 121 against the detent balls 74. This additional axial force serves to provide additional camming force between the snapring 64*a* and the detent balls 74 to provide sufficient radial camming force to overcome the hoop force provided by the o-ring 76. The detent balls 74 are thus cammed to move radially outwardly within holes 84 and allow the snapring 64*a* and control shaft assembly 60 to axially advance past the detent balls 74 in direction 121. As such, the interaction between snapring 64*a* and detent balls 74 may be considered as a cam-and-follower interaction, where the snapring 64*a* serves to provide a camming surface and the detent balls 74 serve as cam followers. Thus the operator may selectively yield and override the detent mechanism, releasing the control shaft 61 to advance linearly in direction 121. With the detent mechanism no longer retaining the control shaft assembly 60 in the retracted orientation, the spring 97, the control shaft assembly 60 is axially released and the spring 97 serves to bias and shuttle the control shaft assembly 60 in direction 121, such that the end portion 99 is now protruding from outer face 46a to enter and engage within counterbore 109. With the end portion 99 now axially overlapping the counterbore 109, the hub assembly 30 is radially aligned and engaged to the dropout 32a. Further, outer faces 46a and 46b are now closely located between end face 103 and inboard face 38b for axial engagement between the hub assembly 30 and the dropouts 32a and 32b. The hub assembly 30 is thus loosely retained to the dropouts 32a and 32b. With the handle 66 in the open position, the lever portion 45 may function as the "wing" of a wingnut to provide manual leverage amplification for rotation of the control shaft assembly 60 about the axial axis 28.

Figure 2E:
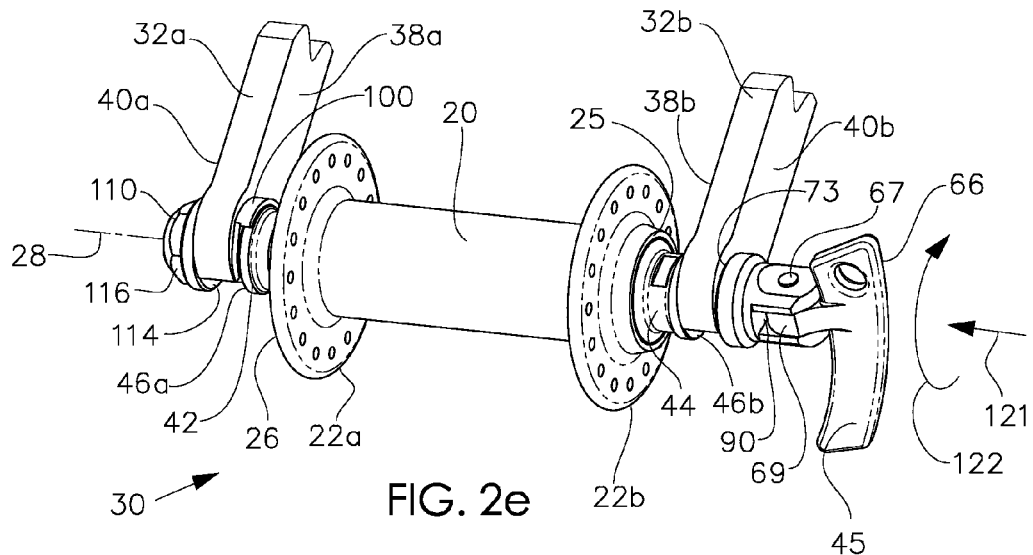

Next, the operator may manually rotate the handle 66 in direction 122, which serves to threadably engage external threads 62 with internal threads 107 and also advances the control shaft assembly 60 further in direction 121, serving to reduce gap 98 until grip face 73 axially abuts outboard face 40b. as shown in FIG. 2e. Outer face 46a is abutting end face 103 and outer face 46b (obscured) is abutting inboard face 38b. Further threadable tightening of the handle 66 in direction 122 serves to axially draw end face 103 toward grip face 73 thereby firmly clamping dropout 32b between grip face 73 and outer face 46b and firmly clamping outer face 46a to end face 103. The hub assembly 30 is now firmly assembled and installed to the dropouts 32a and 32b. This is considered the installed position of the hub assembly 30 where the hub assembly 30 is firmly clamped to the dropouts 32a ad 32b.

Figure 2F:
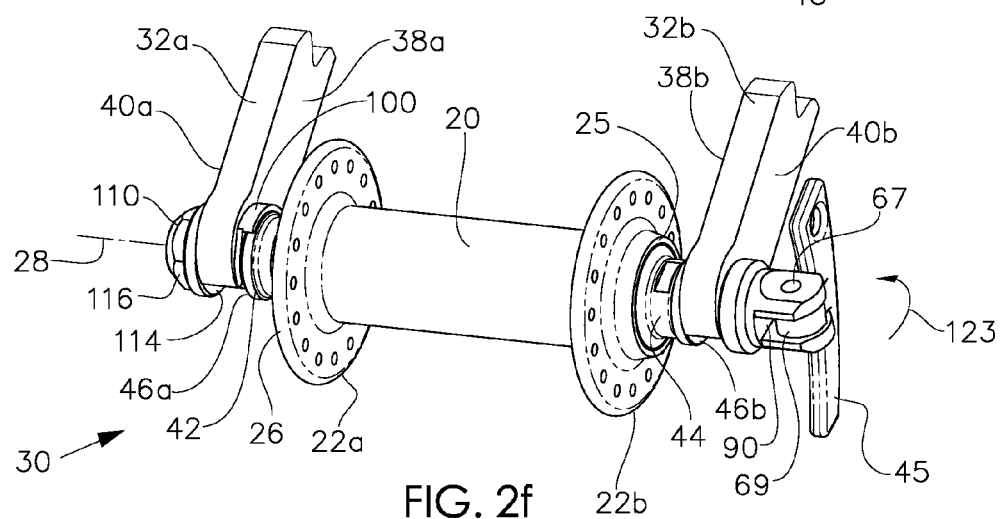

Next, as shown in FIG. 2f, the handle 66 may next be folded and pivoted about pin 67 in direction 123 to its "closed" position to reduce the overall axial width of the hub assembly 30 and to create a more aerodynamic and compact aesthetic appearance. While the capability to fold handle 66 as described herein is not a requirement for proper function of this embodiment, it serves to provide the convenience of a lower profile assembly, as preferred by many cyclists.

The procedure for uninstallation and removal of the hub assembly 30 from the dropouts 32a and 32b is basically the reverse of the assembly sequence just described. For removal, the control shaft assembly 60 is unscrewed via handle 66 until the external threads 62 are disengaged from the internal threads 107. The handle 66 is then withdrawn in axial direction 118 to again yield and override the detent mechanism to advance the control shaft in direction 118 past the detent balls 74 and returning the control shaft assembly 61 to the retracted position as shown in FIGS. 2b-c. The detent mechanism now serves to retain the control shaft assembly 60 in this retracted position. The hub assembly 30 and its associated wheel may now be uninstalled or removed in the generally radially outboard direction, in a reverse of the procedure described above, to complete the and removal procedure.

This linear detent mechanism or detent system serves to temporarily retain the control shaft assembly 60 in the retracted position as a convenience for ease of installation of the hub assembly 30 as it is brought into position between the dropouts 32a and 32b as shown in the transition between FIGS. 2c and 2d. Similarly, this linear detent system serves as a convenience when uninstalling and removing the hub assembly 30 from the dropouts 32a and 32b. When the control shaft assembly 60 is urged linearly in the direction 121 as previously described, the compression spring 97 serves as a means to axially bias and push the control shaft assembly 60 and external threads 62 toward its axially extended position in the direction 121 (as shown in FIGS. 2d-f), for engagement with the adapter 100. It should be noted that the spring-bias provided by spring 97 as described herein provides a convenience and is not a requisite for the proper functionality of the present invention. Also, the details of the spring-biased detent mechanism described herein are merely a representative design to provide this axial retaining function. A wide range alternative arrangements may be employed to provide similar functionality as dictated by geometric constraints and the desired function.

While the embodiment of FIGS. 2a-q shows the control shaft assembly 60 as biased by the compression spring 97 toward the extended position, it is envisioned that the control shaft assembly 60 may alternatively be biased toward the retracted position. For example, the spring 97 may instead be positioned between snapring 64b and shoulder 41 to bias the control shaft assembly 60 in direction 118.

While the linear detent system described herein serves to retain the control shaft assembly 60 in the axially retracted position, such a linear detent system may be alternatively employed to retain the control shaft assembly 60 in whatever axial position desired, whether it be the axially extended position, the axially retracted position, or some position in between.

While the detent mechanism of FIGS. 2a-q provides single axial detent engagement as the control shaft is advanced in a given axial direction, it is envisioned that a multiplicity of axially spaced detent engagements may be employed to provide axial retaining of the control shaft in a multiplicity of axial positions as the control shaft is axially advanced in a given axial direction. Such an arrangement may include a multiplicity of axially spaced camming surfaces and/or a multiplicity of axially spaced follower surfaces.

As shown in FIGS. 2b-d and 2g, with the control shaft assembly 60 in the retracted position, the end portion 99 is shown to be slightly axially recessed relative to the outer face 46a. Alternatively, the detent mechanism may be arranged such that the end portion 99 may be axially flush or else axially protruding from outer face 46a in the retracted position.

In addition to being axially shuttled as described, the control shaft 61 has a generally smooth circular cylindrical surface such that, in both the extended and retracted positions, the control shaft assembly 60 may be rotated relative to the sleeve 58 about the axial axis 28. Such rotation is especially beneficial when attempting to threadably engage external threads 62 with internal threads 107. Meanwhile, adapter 100 is axially and rotatably fixed to the dropout 32a of the frame (not shown). Thus, the moveable control shaft assembly 60 of the hub assembly 30 is operative to selectively engage the dropout 32a. In an alternative design, the control shaft assembly may be rotatably keyed to the axle assembly such that it is non-rotatable and may only be axially shuttled.

Figure 2G:
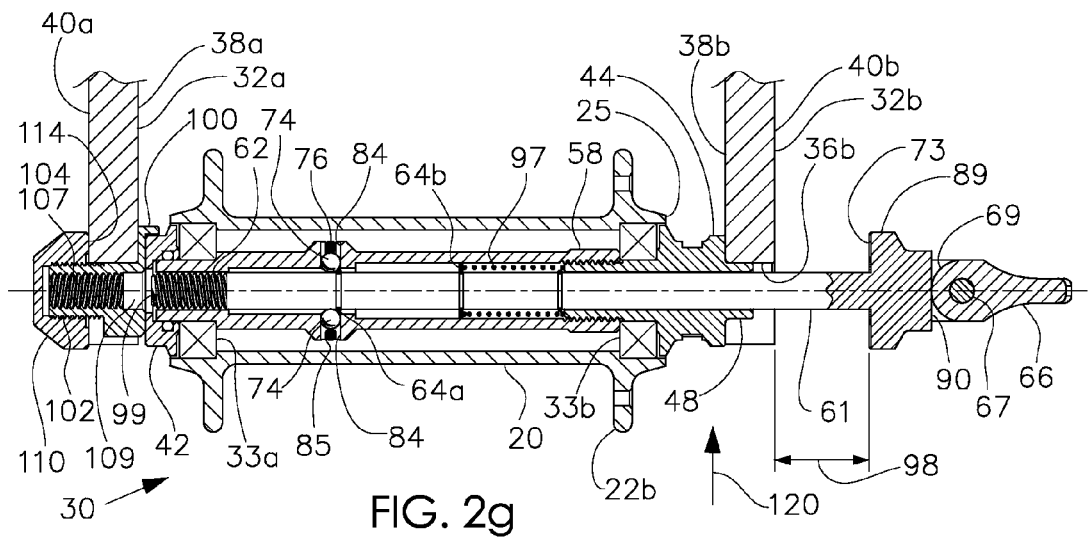
FIGS. 2g-i are axial cross-sectional views taken along 51-51 of the embodiment of FIG. 2a, showing the progressive sequential steps involved in assembling the hub assembly to the dropouts.
Figure 2H:
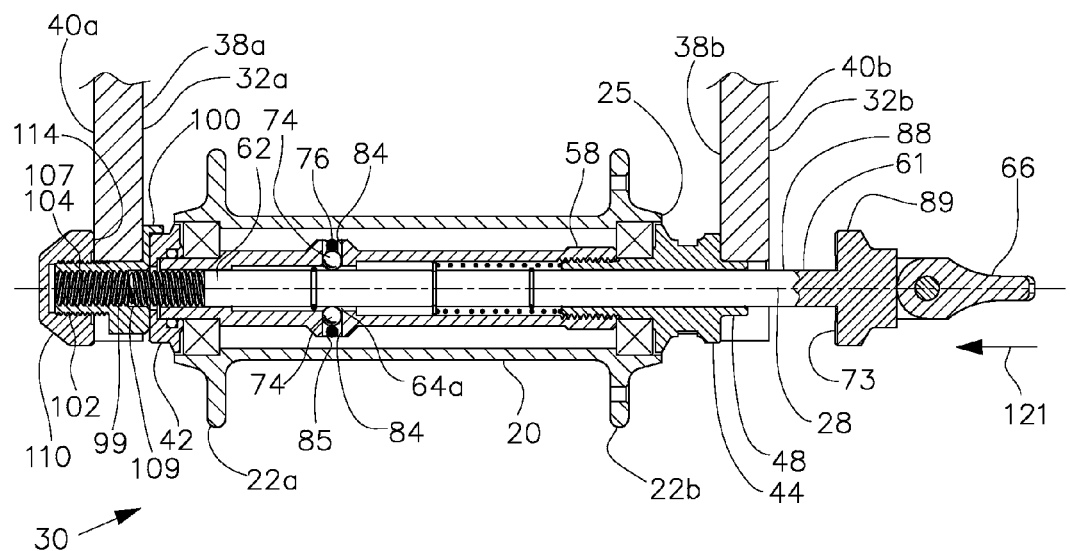

FIG. 2g shows the initial portion of the assembly sequence of FIG. 2d in cross section, with hub assembly 30 (with control shaft assembly 60 therein) moved in the generally radial direction 120 relative to the dropouts 32a and 32b such that the stub 48 is nested within slot 36b and the cylindrical alignment surface 43 of axlecap 42 is radially nested with alignment surface 106. The hub assembly 30 is now pre-assembled to the dropouts 32a and 32b. Next, FIG. 2h shows the final portion of the assembly sequence of FIG. 2d in cross section, where the operator has manually pushed the handle in direction 121 to forcibly override the detent mechanism and to axially advance the control shaft assembly 60 and snapring 64a past the spring-loaded detent balls 74. The control shaft assembly 60 is no longer axially restrained by the detent mechanism and is now released to easily advance in direction 121. The spring 97 then serves to further bias and advance the control shaft assembly 60 in direction 121, such that the end portion 99 is now axially overlapping the counterbore 109 and the hub assembly 30 is thereby radially engaged to the adapter 100 and dropout 32a.

Figure 2I:
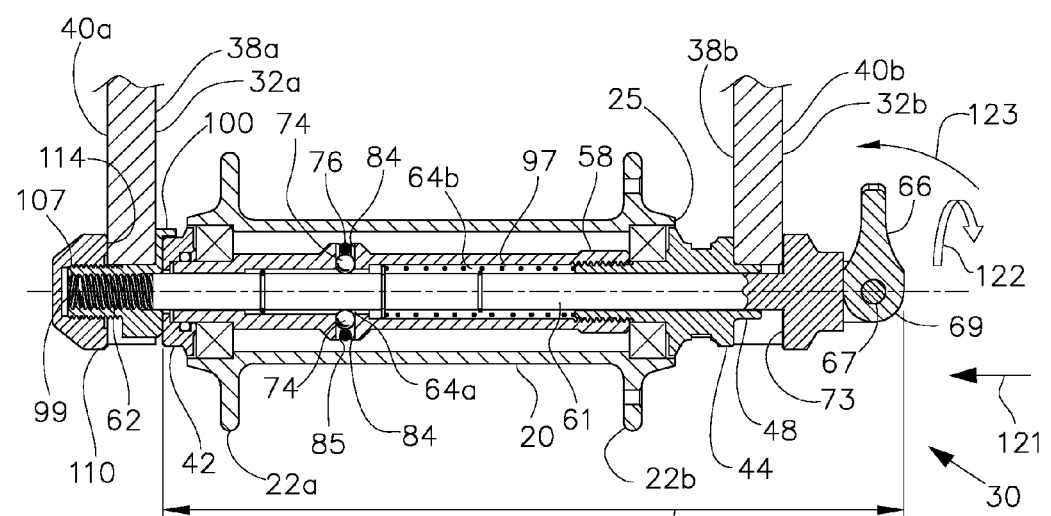

Finally, FIG. 2i shows the assembly sequence of FIG. 2f in cross section, where the hub assembly 30 is installed and assembled and firmly connected to the dropouts 32a and 32b. The operator has manually rotated the handle 66 in direction 122 to threadably engage external threads 62 with internal threads and advance the control shaft assembly 60 further in direction 121, serving to axially draw grip face 73 toward end face 103 thereby firmly axially clamping dropout 32b between grip face 73 and outer face 46b and firmly clamping outer face 46a to end face 103. Grip face 73 also serves as an axial travel limit stop to the control shaft assembly 60. The hub assembly 30 is now firmly assembled and installed with the dropouts 32a and 32b. The handle 66 has next been folded in direction 123 to reduce the overall axial width 124 of the hub assembly 30 and to create a cleaner and more compact aesthetic appearance. The hub assembly 30 may be removed or uninstalled from the dropouts 32a and 32b in the reverse of the assembly sequence just described in FIGS. 2c-i. Thus, it is shown that, with the aid of the axial detent mechanism just described, the installation and removal of the hub assembly 30 is a simple one-handed procedure that requires only one hand to pre-assemble the hub assembly 30 (and corresponding wheel (not shown)) and then only one hand to manually manipulate the handle 66 and leaving the other hand free during the entire procedure to steady the bicycle (not shown).

Since it is desirable to allow for fast installation of the hub assembly, it may be preferable to use a "fast" thread form for the threadable engagement between external threads 62 and internal threads 107, rather than a common conventional thread form. One example of a fast thread form is to utilize a single-lead thread form of particularly coarse pitch, such as an acme thread form. Another example of a fast thread form is to utilize a multi-start or multi-helix thread form (also known as a "multiple-lead" thread) such as a two-start thread as is known in industry.

While the detent balls 74 serve to provide an axial retaining means between the sleeve 58 and the control shaft assembly 60, it is noted that the control shaft assembly 60 is freely rotatable at all points in its axial travel. This is a preferred feature, since the control shaft 61 must be rotatable to threadably assemble the external threads 62 with internal threads 107. However, the control shaft assembly 60 may alternatively be rotationally fixed to the sleeve 58 or else the control shaft assembly 60 may employ a rotational detent mechanism relative to the sleeve 58.

While the stub 48 provides a convenient circular cylindrical surface to nest within the geometry of the slot 36b, the stub 48 may alternatively have a wide range of geometries, some of which may not be circular, that will interface with the dropout 32b. As a further alternative, the stub 48 portion may be eliminated entirely and the control shaft 61 may instead serve to provide the radial locating interface with slot 36b.

While the handle 66b is shown to be foldable as described herein, it is understood that this folding is a convenience to provide a lower profile appearance after the hub assembly 30 is assembled to the dropouts 32a and 32b. The handle may alternatively be non-foldable. Further, while the handle 66 is shown to include two "wings" (similar to a wingnut) for additional manual leverage when tightening or loosening the threaded assembly between external threads 62 and internal threads 107, the handle may alternatively employ a wide range of shapes and geometries. For example, a hex socket (not shown) may be substituted for the handle, which could receive a hex key (not shown) for manual manipulation of the control shaft assembly 60. As another example, a knurled knob (not shown) may be substituted for the handle 66. It may be preferable that the handle include noncircular geometry (about the axial axis) to facilitate manual rotation of the control shaft assembly.

Figure 3A:
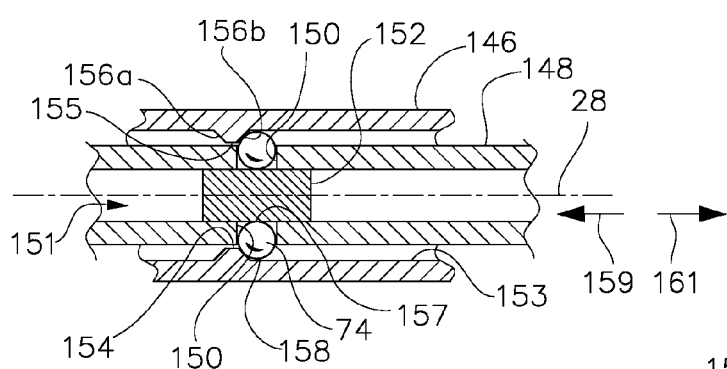
FIG. 3a is an axial cross section detail view, corresponding to the assembly sequence of FIGS. 2b-d, of a second embodiment of the present invention, with the detent balls axially retained with the control shaft and biased radially outwardly by an elastomer spring, with an internal camming rib in the sleeve.
Figure 3B:
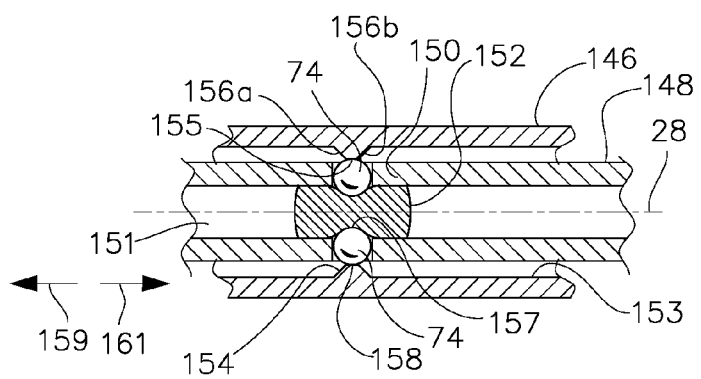
FIG. 3b is an axial cross section detail view, corresponding to the assembly sequence of FIG. 2L, of the embodiment of FIG. 3a, where the camming rib serves to cam the detent balls radially inwardly against the elastomer spring.
Figure 3C:
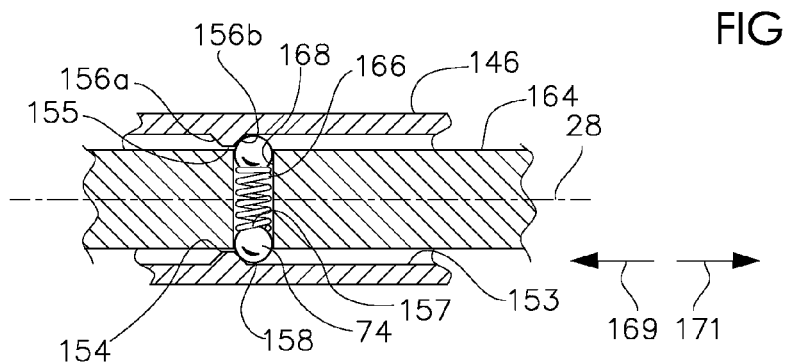
FIG. 3c is an axial cross section detail view, corresponding to the assembly sequence of FIG. 3a, of an alternate embodiment to FIG. 3a, where the elastomer spring is eliminated in favor of a helical compression spring.

The combined assembly of the sleeve assembly 59 and axlecaps 42 and 44 serve as an outer axle assembly that is discreet from the control shaft assembly 60. This outer axle assembly is axially fixed relative to the hub shell 20, while the control shaft assembly may be axially shuttled within this outer axle assembly. Alternatively, the components of the outer axle assembly may be omitted and the control shaft assembly may be axially shuttled within the bearings 33a and 33b. In such an arrangement, it is preferable that the control shaft assembly include a spring-loaded detent system, an example of which is shown in FIGS. 3a-c. This spring-loaded detent system could then provide axial retaining engagement with the inner race of bearings 33a and/or 33b.

Figures 2J, 2K:
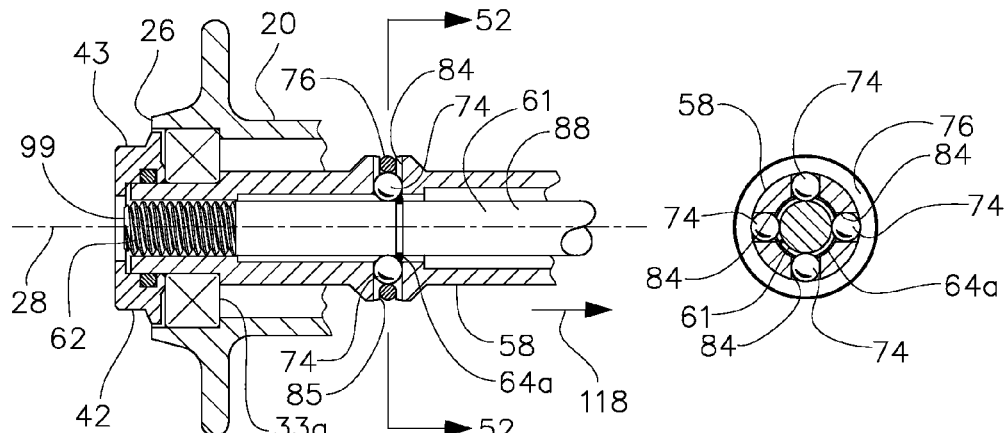
FIG. 2j is an enlarged cross section detail view of the embodiment of FIG. 2a, corresponding to FIGS. 2b-d.
FIG. 2k is an enlarged cross section detail view of the embodiment of FIG. 2a, taken along 52-52 of FIG. 2j.

FIGS. 2j-n describe the detent mechanism of FIGS. 2a-i in greater detail. FIGS. 2j and 2k correspond to axial position of the control shaft assembly 60 described in FIG. 2g where the spring-loaded detent balls 74 are in a retaining orientation and serve to restrict the axial movement of the snapring 64a and thereby retain the axially retracted position of the control shaft assembly 60 relative to the hub shell 20. The radially outboard periphery of snapring 64a is shown to have a radial overlie with the radially inboard periphery of detent balls 74. This overlie engagement serves to retain the control shaft assembly 61 in the axial position shown in FIG. 2j relative to the sleeve 58. The spring 97 (not shown in FIGS. 2a-i) serves to provide an axial load to bias the control shaft assembly 60 in direction 121, which normally would tend to cause the snapring 64a to ramp and cam the detent balls 74 radially outwardly within their holes 84. However, the radially inward preload provided by the o-ring 76 is greater than this radially outward camming force, so the detent balls stay in their radial inward position and restrict axial movement of the control shaft assembly 60 in direction 121. It may be considered that the detent mechanism described in FIGS. 2j-n is a spring-energized or spring-loaded linear detent mechanism, where the o-ring 76 serves as a spring to energize and pre-load detent balls 74 to bear against a camming surface (i.e. snapring 64a).

Figures 2L, 2M:
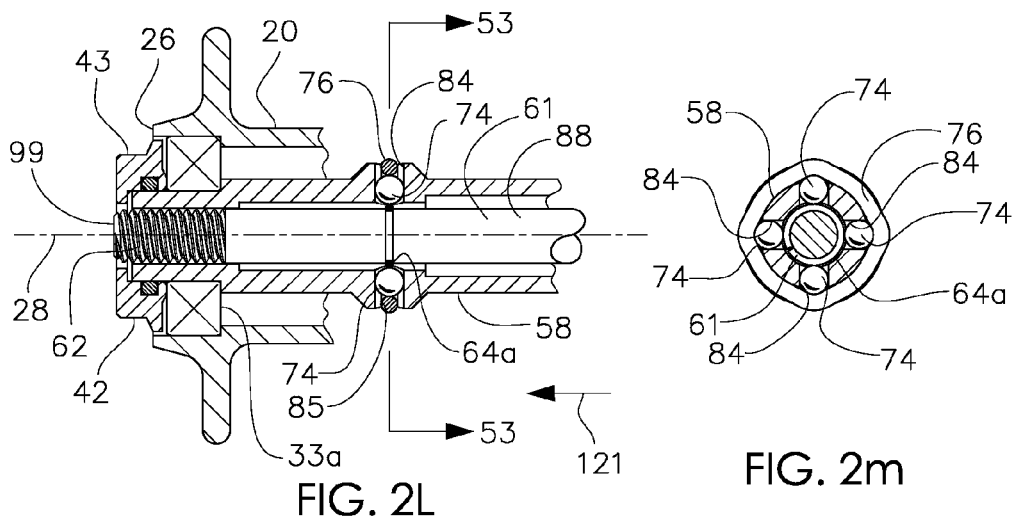
FIG. 2L is an enlarged cross section detail view of the embodiment of FIG. 2a, corresponding to an intermediate assembly sequence between FIGS. 2d and 2e, as the detent balls are cammed radially outwardly over the apex of the snapring.
FIG. 2m is an enlarged cross section detail view of the embodiment of FIG. 2a, taken along 53-53 of FIG. 2L.

FIGS. 2L and 2m correspond to the transitional axial position of the control shaft assembly 60 between the two axial positions describe in FIGS. 2g and 2h. The head portion 89 has been manually pressed in direction 121 and this additional manual force serves to further axially press the snapring 64a against the detent balls 74 and to linearly override the radial inward force provided by the o-ring 76, which allows the control shaft assembly 60 to advance slightly in direction 121, simultaneously camming the detent balls 74 radially outwardly and thereby further stretching the elastic o-ring. FIGS. 2L-m show the detent balls contacting the radially outward peak or apex of the snapring 64a, with the o-ring in maximum stretch, and with detent balls 74 radially outwardly retracted within holes 84 in a releasing orientation. This stretch is particularly evident in FIG. 2*m*, where the detent balls 74 are shown radially protruding from the root of the o-ring groove 85, with the o-ring 76 correspondingly stretched and bumped radially outwardly at the detent ball 74 locations.

Figure 2N:
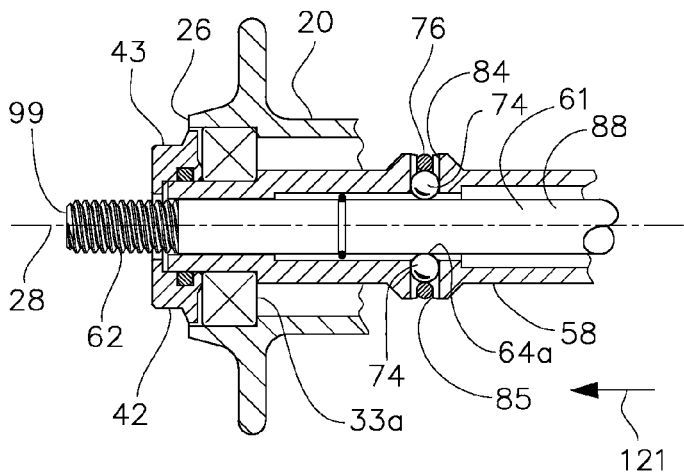
FIG. 2n is an enlarged cross section detail view of the embodiment of FIG. 2a, corresponding to FIG. 2i.

FIG. 2*n* corresponds to the axial position of the control shaft assembly 60 described in FIG. 2*i* where the snapring 64*a* has further advanced in direction 121 past the spring-loaded detent balls 74, which now no longer provide the restrictive retention described in FIGS. 2*j-k*. The control shaft assembly 60 is now shown in its extended position relative to the hub shell 20. The detent balls 74 have now moved radially inwardly and the control shaft assembly 60 may be further advanced in direction 121 without appreciable restriction from the detent balls 74. Later, when the operator attempts to return the control shaft assembly 60 to its retracted position, the operator need only pull the handle 66 to advance the control shaft assembly 60 in direction 118. The snapring 64*a* will again cam against the detent balls 74 to override the radial inward preload provided by the o-ring 76, allowing the shaft assembly 60 to be returned and retained in the retracted position.

Figure 2O:
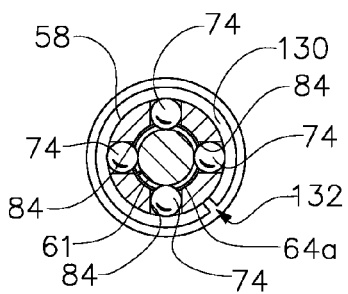
FIG. 2o is a cross sectional detail view, taken along 52-52, of an alternate arrangement of the embodiment of FIG. 2a, where a C-clip is substituted for the o-ring of FIGS. 2a-n.
Figure 2P:
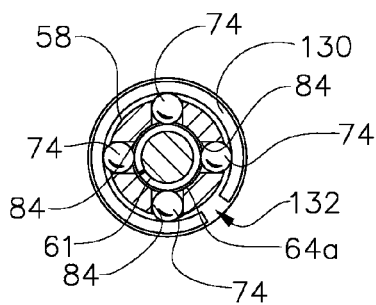
FIG. 2p is a cross sectional detail view, taken along 53-53, of the embodiment of FIG. 2m, corresponding to the assembly sequence of FIGS. 2L-m.
Figure 2Q:
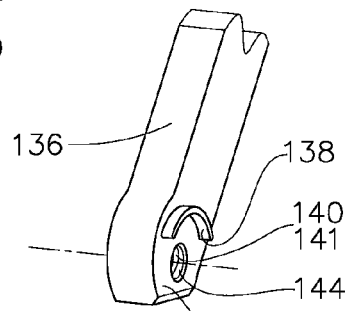
FIG. 2q is a perspective view corresponding to the view of FIG. 2a, where the adapter and nut are eliminated in favor of an alternate dropout configuration that includes geometry otherwise associated with the adapter, including the alignment surface and internally threaded hole.

FIGS. 2*o* and 2*p* correspond to FIGS. 2*k* and 2*m* respectively, with the exception that a circumferentially wrapped spring 130 is substituted for the o-ring 76. In contrast to the o-ring 76 of FIGS. 2*a-n*, which is shown to circumferentially stretch in order to provide the radially inward energizing force to the detent balls 74, FIGS. 2*o* and 2*p* utilize a wrapped spring 130, which circumscribes the detent balls 74 and is shown to utilize bending to provide this energizing force. FIG. 2*o* corresponds to the sequence described in FIG. 2*j-k* where the detent balls 74 are at their radially inward position, with the wrapped spring 130 providing the radially inward preload or bias to the detent balls 74. The circumferential gap 132 between the ends 134*a* and 134*b* of wrapped spring 130 is shown to be minimal or contacting, as is the preferred arrangement. Next, FIG. 2*p* corresponds to the sequence described in FIG. 2L-*m* where the detent balls 74 are cammed or ramped by the snapring 64*a* to move radially outwardly. This serves to radially expand the wrapped spring 130 as shown, with the gap 132 temporarily circumferentially expanded. While the wrapped spring 130 is shown here to provide close to 360 degrees of circumferential wrap, it is also envisioned that such a wrapped spring may provide less than 360 degrees of wrap, resulting in a larger gap 132. As a further alternative, the wrapped spring 130 may have greater than 360 degrees of circumferential wrap. In such a case, the ends 134*a* and 134*b* would circumferentially overlap and any gap 132 would be eliminated.

FIG. 2*q* describes an alternate dropout 136 that may be substituted for the dropout 32*a*, the adapter 100, and the nut 110. Dropout 136 is a monolithic or an integral assembly that incorporates the geometry and features of the adapter 100. Dropout 136 includes hole 140, inboard face 142, and a concave alignment surface 138. Hole 140 includes a counterbore 144 portion that extends axially from inboard face 142 through a portion of hole 140 and is of a diameter sized to accept the major diameter of external threads 62 of the control shaft 61. Hole 140 also includes an internal thread 141 portion extending axially from the base of the counterbore 144 through the remainder of the dropout 136. Internal threads 141 are sized to threadably mate with external threads 62 of the control shaft 61.

As shown in FIG. 2*a*, dropout 32*a* is of a generally conventional "slotted" design and includes an open slot 36*a* to receive a conventional hub assembly (not shown).

Adapter 100 and nut 110 are required to adapt dropout 32*a* to receive the hub assembly 30, as shown in FIG. 2*c*. Alternatively, dropout 136 may be substituted for the combined assembly of dropout 32*a*, adapter 100, and nut 110. As shown in FIG. 2*q*, dropout 136 is purpose-built to receive the hub assembly 30 and incorporates geometry and features otherwise included in the adapter 100. These geometries and features have similar functionality to the analogous geometries and features associated with the adapter 100 and as described herein. Dropout includes inboard face 142, which corresponds to inboard face 38*a*, and alignment surface 138, which corresponds to alignment surface 106, and hole 140 with internal threads 141 and counterbore 144, which corresponds to hole 104 with internal threads 107 and counterbore 109. Dropout 136 may thus be substituted for dropout 32 and adapter 100 and nut 110 to receive the hub assembly 30 as described in FIGS. 2*c-e*.

FIGS. 2*a-q* describe a design where the detent balls 74 are axially retained to the sleeve 58 and are energized or biased radially inwardly and where the detent camming surface (i.e. snapring 64*a*) is axially fixed to the control shaft assembly 60. Conversely, FIGS. 3*a-d* describe a variety of arrangements where the detent balls 74 are axially retained to the control shaft and are energized or biased radially outwardly and where the detent camming surface is axially fixed to the sleeve. FIGS. 3*a-d* are focused on the detent mechanism and it is understood that these detent mechanisms may be substituted for the detent mechanism of the overall arrangement of FIGS. 2*a-q*.

While the embodiment of FIGS. 2*a-q* shows the detent balls axially retained to the sleeve 58, with a radially inward bias to engage a cam surface of the control shaft assembly 60, this arrangement may alternatively be reversed, with the detent balls 74 axially retained to the control shaft, with a radially outward bias to engage a cam surface in the sleeve, as illustrated in FIGS. 3*a-d*.

In FIGS. 3*a-b*, sleeve 146 is substituted for sleeve 58 and control shaft 148 is substituted for control shaft 61. Control shaft 148 is coaxial with sleeve 146 and includes radial holes 150 therethrough that are sized to receive detent balls 74. Control shaft 148 includes a cavity 151 with a resilient elastomer plug 152 positioned therein. Sleeve 146 includes a cylindrical internal surface 153 with a circumferential rib 154 projecting radially inwardly therefrom. Rib 154 includes a cam surfaces 156*a* and 156*b* and radially inboard apex 155 to interface with detent balls 74. FIG. 3*a* corresponds to the assembly sequence described in FIG. 2*j* and detent balls 74 are positioned within corresponding holes 150, with their radially inboard spherical periphery 157 contacting the plug 152 and with their radially outboard periphery 158 having radial clearance with internal surface 153. The plug 152 serves to provide a radially outward bias force to the detent balls 74. The detent balls 74 are axially retained to the control shaft 148 by holes 150. Detent balls 74 are contacting cam surface 156*b* of the sleeve 146, with the interface between cam surface 156*b* and detent balls 74 serving to axially retain and restrain the control shaft 148 from moving in direction 159 relative to the sleeve 146. The interaction between the cam surface 156*b*, the detent balls 74, the holes 150 and the plug 152 may be considered as a spring-loaded detent mechanism to retain the axial position of the control shaft 148 relative to the sleeve 146. The plug 152 serves as a resilient spring to bias the detent balls 74 radially outwardly. Optionally, a spring (not shown) may be utilized to bias the control shaft 148 in direction 159 in a manner similar to spring 97.

FIG. 3b shows that the control shaft 148 has been manually pressed or nudged in direction 159 to yield and override this detent mechanism such that the control shaft 148 may now be further displaced in direction 159 such that cam surface 156b has ramped and cammed the detent balls 74 to move radially inwardly within their holes 150 such that their inboard spherical periphery 157 impinges upon the plug 152. The detent balls 74 serve as cam followers, with their outboard peripheries 158 serving as follower surfaces. The plug 152 yields to the radial inward force of the detent balls 74 and temporarily deforms correspondingly to permit the detent ball 74 to move radially inwardly such that their outboard periphery 158 may axially advance in direction 159 past the radially inboard apex 155 of the rib 154. FIG. 3b corresponds to the assembly sequence of FIGS. 2L-m. The control shaft 148 may now be easily further advanced in direction 159. Plug 152 is made of a resilient material, such as synthetic elastomer, that has elastic qualities that serve as a radial spring to bias the detent balls 74 radially outwardly. When the control shaft 148 and detent balls 74 are further axially advanced in direction 159 past the rib 154, the plug 152 will serve to bias the detent balls 74 radially outwardly. Similarly, cam surface 156a may next serve to ramp and cam detent balls 74 to move radially inwardly within their holes 150 when the detent balls 74 and control shaft 148 are advanced in direction 161 past rib 154.

The embodiment of FIG. 3c is identical to that of FIG. 3a-b, with the primary exception that a wire compression spring 166 is substituted for plug 52. In FIG. 3c, control shaft 164 includes a cross hole 168 that houses detent balls 74 and spring 166 therebetween. Sleeve 146 and detent balls 74 are identical to those described in FIGS. 3a-b. FIG. 3c corresponds to the assembly sequence described in FIG. 2j. Spring 166 is positioned between detent balls 74 such that their radially inboard spherical periphery 157 contacts the opposing ends of spring 166 and with their radially outboard periphery 158 has contact with internal surface 153. The detent balls 74 are axially retained to the control shaft 164 within cross hole 168. Spring 166 serves to energize, preload, and bias detent balls 74 toward a radially outward orientation. As such, FIG. 3c describes a linear detent mechanism of generally identical function to that of FIGS. 3a-b as described hereinabove. Optionally, a spring (not shown) may be utilized to axially bias the control shaft 164 in direction 169 in a manner similar to spring 97. The control shaft 164 may be manually pressed or nudged to override this detent mechanism such that the control shaft 164 may now be displaced in direction 169 such cam surface 156b has ramped and cammed the detent balls 74 to move radially inwardly within cross hole 168 such that their inboard spherical periphery 157 impinges and compresses the spring 166, permitting their outboard periphery 158 to clear the radially inboard apex 155 of the rib 154. The control shaft 164 may now be easily further advanced in direction 169. Similarly, cam surface 156a may next serve to ramp and cam detent balls 74 to move radially inwardly within cross hole 168 when the detent balls 74 and control shaft 164 are advanced in direction 171 past rib 154.

Figure 3D:
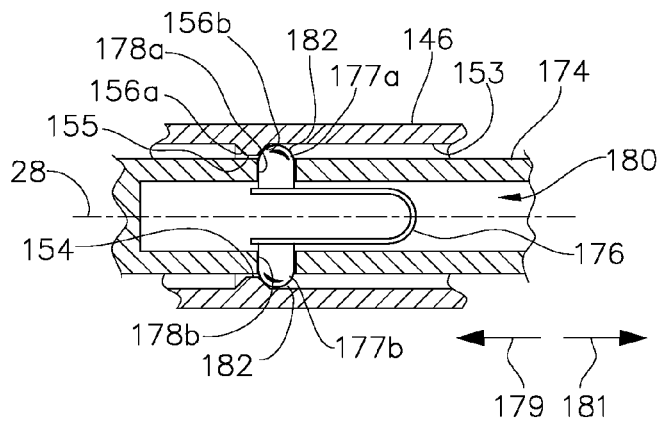
FIG. 3d is an axial cross section detail view, corresponding to the assembly sequence of FIG. 3a, of an alternate embodiment of FIG. 3a, where an elastomer spring is substituted by a cantilever leaf spring and the detent balls are substituted by radial projections.

The embodiment of FIG. 3d is identical to that of FIG. 3a, with the primary exception that a U-shaped leaf spring 176 is substituted for plug 52 and projections 177a and 177b are substituted for detent balls 74. In FIG. 3d, control shaft 174 includes cross holes 178a and 178b with corresponding projections 177a and 177b extending therethrough, and cavity 180 to house the leaf spring 176. Sleeve 146 is identical to that described in FIGS. 3a-b. FIG. 3d corresponds to the assembly sequence described in FIG. 2j. Cantilevered leaf spring 176 is positioned between projections 177a and 177b such that their dome-shaped radially outboard periphery 182 has contact with internal surface 153. Projections 177a and 177b may be affixed to the leaf spring 176 as shown or the leaf spring 176 may simply bear against the projections without being affixed thereto. The projections 177a and 177b are axially retained to the control shaft 174 within cross holes 178a and 178b respectively. Leaf spring 176 serves to preload and bias projections 177a and 177b radially outwardly. Projections 177a and 177b are contacting cam surface 156b of the sleeve 146, with the interface between cam surface 156b and projections 177a and 177b serving to axially retain and restrain the control shaft 174 from moving in direction 179 relative to the sleeve 146. The interaction between the cam surface 156b, the projections 177a and 177b, and the leaf spring 176 may be considered as a spring-loaded detent mechanism to retain the axial position of the control shaft 174 relative to the sleeve 146. The arrangement of FIG. 3d provides a detent mechanism with generally identical function to that described in FIGS. 3a-b and as described above. The control shaft 174 may be manually pressed or nudged to override this detent mechanism such that the control shaft 174 may now be displaced in direction 179 such cam surface 156b has ramped and cammed the projections 177a and 177b to move radially inwardly within cross holes 178a and 178b to flex the leaf spring 176, permitting their outboard peripheries 182a and 182b move radially inwardly to clear the radially inboard apex 155 of the rib 154. The control shaft 164 may now be easily further advanced in direction 179. Similarly, cam surface 156a may next serve to ramp and cam projections 177a and 177b to move radially inwardly when the control shaft 174 is advanced in direction 181 past rib 154.

Figure 4A:
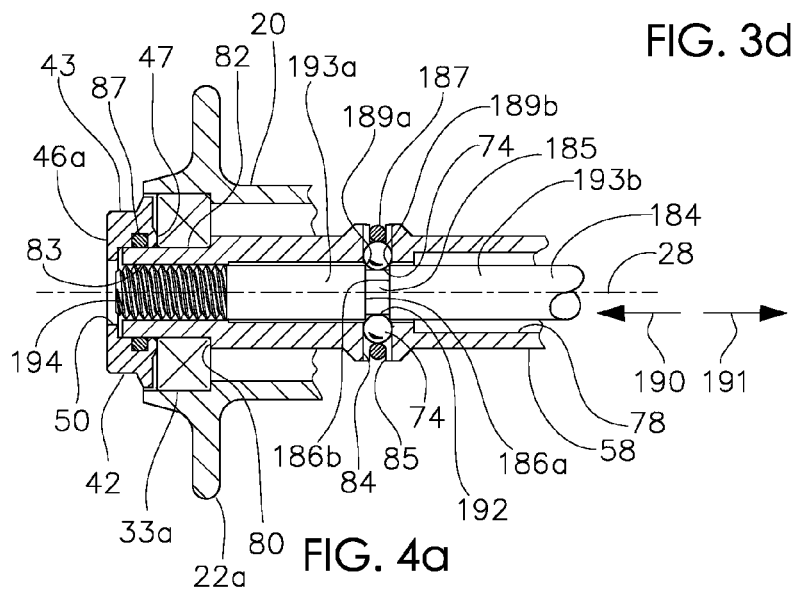
FIG. 4a is an axial cross section detail view, corresponding to the assembly sequence of FIG. 2j, of a third embodiment of the present invention, with detent balls axially retained in the sleeve and a recessed detent camming surface of the control shaft.
Figure 4B:
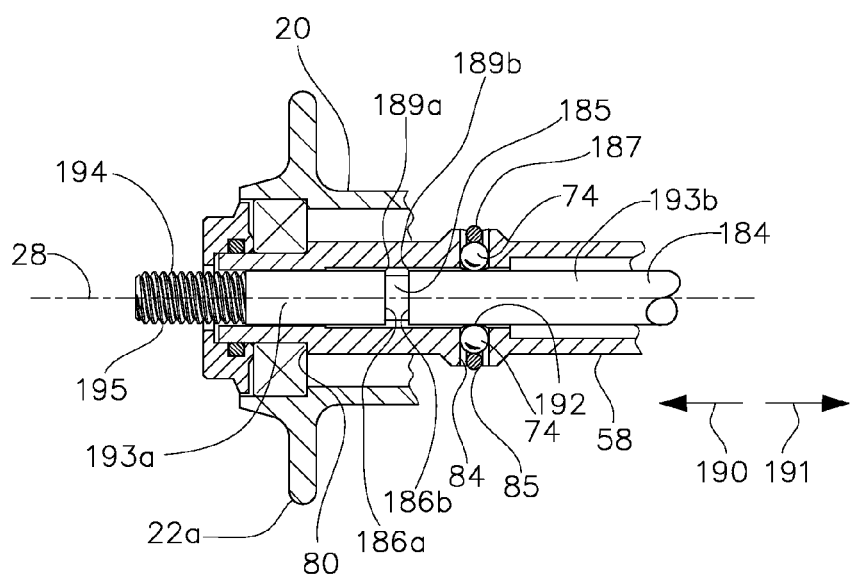

In contrast to the raised or projecting cam surfaces in the embodiments of FIGS. 2a-q and FIGS. 3a-d, the embodiment of FIGS. 4a-b include a control shaft 184 with a recessed cam surface. Circumferential detent groove 185 is recessed within control shaft 184 to provide detent geometry. This detent groove 185 is in contrast to the raised snaping 64a of FIGS. 2a-q, which is utilized to provide detent geometry to interface with detent balls 74. The assembly sequence of FIG. 4a corresponds to that of FIG. 2j, with the control shaft 184 shown in the retracted orientation relative to the sleeve 58. Axlecap 42, hub shell 20, sleeve 58, and detent balls 74 are all identical to those described in FIGS. 2a-n. Control shaft 184 is generally coaxial with sleeve 58 and includes groove 185 with radially inward step surfaces 186a and 186b and shoulder 189a located proximal to the engagement end 194 and with shoulder 189b located proximal the handle end. Shoulders 189a and 189b provide raised circumferential detent cam surfaces relative to step surface 186. In FIG. 4a, detent balls 74 are shown to be retained within their holes 84 and also nested within detent groove 185, with the o-ring 187 circumferentially stretched to provide a radially inward preload or bias to the detent balls 74 as previously described. The radially inboard periphery 192 of detent balls 74 contact the root of the detent groove 185 such that there exists a radial overlie between inboard periphery 192 and shoulders 189a and 189b. Thus, shoulders 189a and 189b serve to provide camming surfaces or edges such that the detent balls 74 serve to retain the control shaft 184 in the axial position shown (relative to the sleeve 58). Later, when advancing the control shaft 184 in direction 191, the combination of this radial preload and the radial overlie between the detent balls 74 and shoulder 189a serves to impede axial movement of the control shaft 184 in direction 191. Similarly, the radial overlie between the detent balls 74 and shoulder 189*b* serves to impede axial movement of the control shaft 184 in direction 190. Thus, the detent groove 185 and biased detent balls 74 provides a bi-directional detent mechanism to axially retain the control shaft 184 in both directions 190 and 191 relative to the sleeve 58.

Next, as shown in FIG. 4*b*, the control shaft is manually pressed in direction 190, causing shoulder 189*b* to press and cam against the detent balls 74, causing the detent balls 74 to ramp radially outwardly within their holes 84, further stretching the o-ring 187 and overriding the axial retention of the control shaft 184. The control shaft may now more easily be shuttled to advance axially in direction 190 relative to the sleeve 58 toward its extended position as shown in FIG. 4*b*. In this extended orientation, the control shaft may be threadably engaged to the adapter 100 and/or to dropout 32*b*. It is noted that the control shaft 184 and groove are generally smooth circumferential surfaces and that, in both the extended and retracted positions, the control shaft 184 may be rotated relative to the sleeve 58 about the axial axis 28. Such rotation is especially beneficial when attempting to threadably engage external threads 195 with internal threads 107 (not shown). It is noted that shoulders 189*a* and 189*b* axially straddle and are both adjacent the detent balls 74 in the axially retained orientation shown in FIG. 4*a*. Thus, if the control shaft 184 were alternatively instead further withdrawn in direction 191, the interaction between detent balls 74 and shoulder 189*a* would provide a yieldable linear detent mechanism in direction 191 as well. As such, the detent mechanism of FIGS. 4*a-b* may be considered to be a bi-directional linear detent mechanism.

Figure 5A:
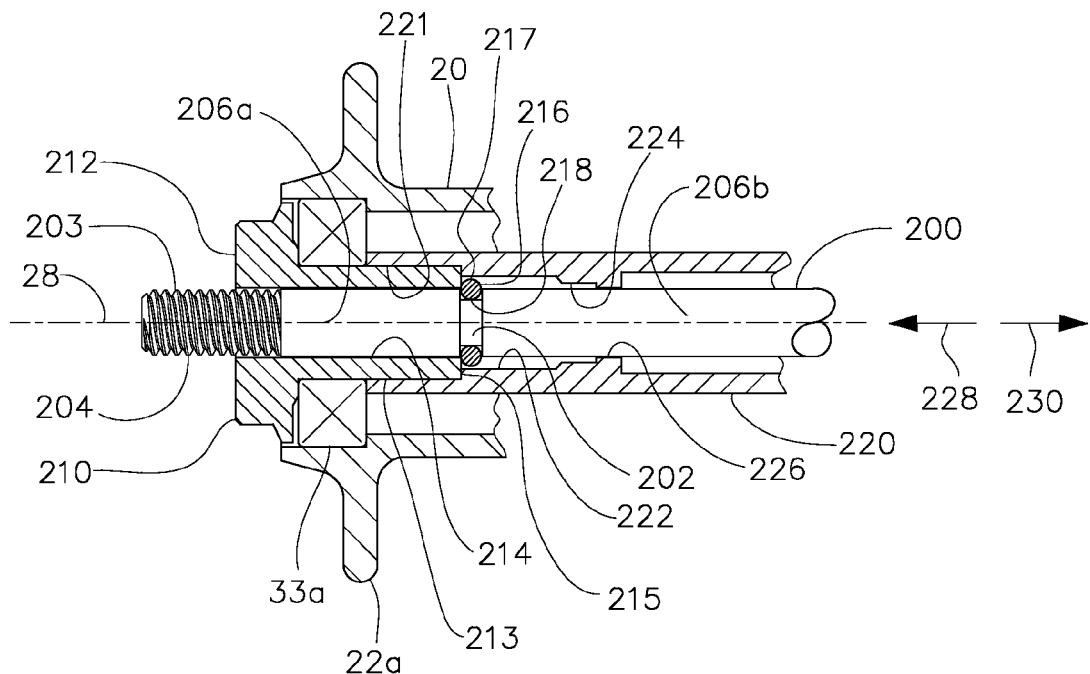
FIG. 5a is an axial cross section detail view, corresponding to the assembly sequence of FIG. 2n, of a fourth embodiment of the present invention, illustrating a frictional gripping means to axially retain the control shaft to the sleeve, with an elastomer o-ring axially retained in the control shaft and a stepped grip surface of the sleeve, with radial clearance between the o-ring and the axle.
Figure 5B:
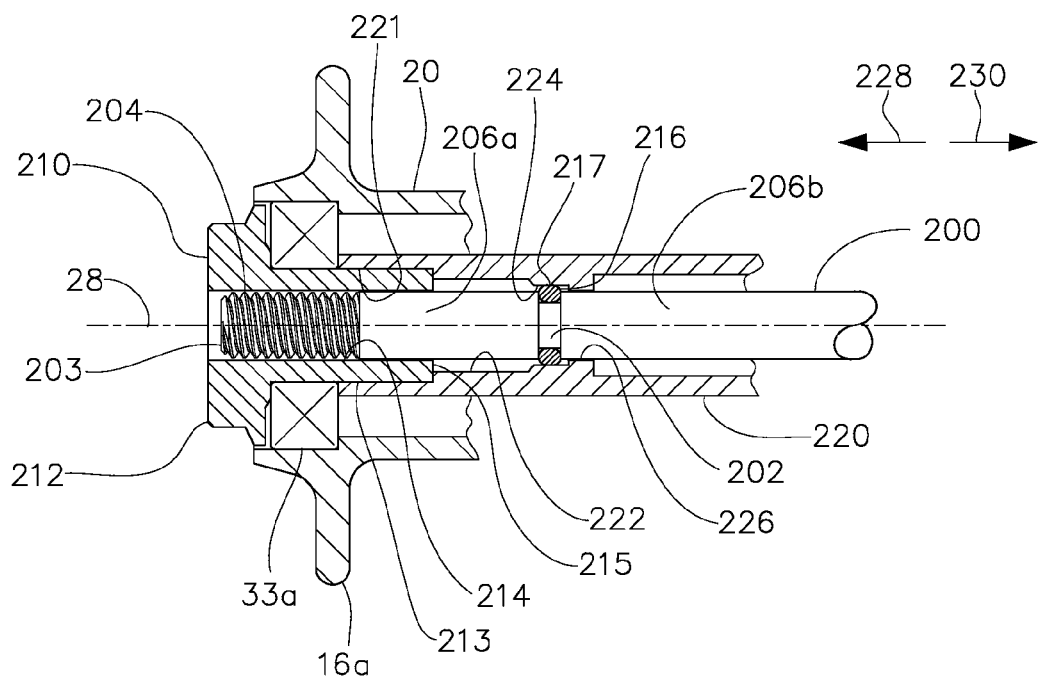
FIG. 5b is an axial cross section detail view, corresponding to the assembly sequence of FIG. 2j, of the embodiment of FIG. 5a, with the o-ring frictionally gripping the sleeve to axially retain the control shaft to the sleeve in the retracted position.

The embodiments of FIGS. 2*a-q*, 3*a-d*, and 4*a-b* have described a spring-loaded linear detent mechanism where a spring-loaded detent ball or projection is cammed to "snap" over a camming surface to axially retain the control shaft in a given axial position relative to the sleeve. Alternatively, a linear gripping retaining means between the control shaft and the sleeve may be substituted for the spring-loaded detent mechanism as a means to retain the control shaft in a given axial position relative to the sleeve. An example of such gripping retaining is illustrated in FIGS. 5*a-b*. As shown in FIG. 5*a*, control shaft 200 is generally coaxial within sleeve 220 and includes groove 202, shank portions 206*a* and 206*b*, and engagement end 203 with external threads 204. The overall function of control shaft 200 is identical to control shaft 61 as described in FIGS. 2*a-q*. A resilient elastomer o-ring 216 is nested within groove 202 in a conventional manner as shown, such that its outboard periphery 217 is radially outboard the shank portions 206*a* and 206*b* and its inboard periphery 218 is contacting the base of groove 202. Hub shell 20 and bearing 33*a* are identical to those described in FIGS. 2*a-q*. Axlecap 210 includes end face 212, collar 213 with end face 215, and an axial through hole 214 to provide clearance for the control shaft 200 to shuttle axially therethrough. Collar 213 extends axially through the inside diameter of bearing 33*a* and within the collar portion 221 of the sleeve 220 as shown.

Sleeve 220 has an axial central opening whose inside diameter is strategically stepped to include a collar portion 221, a clearance portion 222, a gripping portion 224, and a limit portion 226. The collar portion 221 is sized to provide a close fit with the collar 213 of the axlecap 210. The clearance portion 222 has an inside diameter that provides radial clearance with the outside diameter of the outboard periphery 217 of o-ring 216. The gripping portion 224 has an inside diameter smaller than the clearance portion 222 and is sized such that its inside diameter is slightly smaller than the outside diameter of outboard periphery 217 of the o-ring 216. As shown in FIG. 5*a*, the control shaft 200 is axially positioned relative to the sleeve 220 such that the o-ring 216 is axially abutting the end face 215. With the diameter of hole 214 sized for close clearance with the shank portion 206*b*, the outboard periphery 217 cannot fit through hole 214 and thus provides an axial limit-stop to restrict the control shaft 200 from advancing further in direction 228. The control shaft 200 is shown in its extended position with engagement end 203 protruding from end face 212. This extended position corresponds to the extended position shown in FIG. 2*n*.

Next, in order to axially retract the control shaft 200, the control shaft 200 is withdrawn in direction 230 relative to the sleeve 220. Since there is clearance between the clearance portion 222 and the outboard periphery 217, the control shaft 200 may advance unimpeded in direction 230 while the o-ring is axially aligned within the clearance portion 222. As the control shaft 200 is further advanced in direction 230, the outboard periphery 217 of the o-ring 216 must be squeezed radially inwardly to fit within the gripping portion 224 with an interference fit therebetween. This squeezing interaction causes the cross section of the o-ring 216 to deform elastically, resulting in a resilient gripping interface between the outboard periphery 217 and the gripping portion 224. Thus, the axially retracted position of the control shaft 200 is maintained by this frictional gripping interface, as shown in FIG. 5*b*. An axial positional retaining means has thus been provided between the control shaft 200 and the sleeve 220 to retain the control shaft 200 in the retracted position. With the inside diameter of limit portion 226 sized for close clearance with the shank portion 206*a*, the outboard periphery 217 cannot fit within limit portion 226, thereby preventing control shaft 200 from inadvertently advancing further in direction 230. The control shaft may be released and advanced in direction 228 by simply pushing the control shaft 200 in direction 228 to override the gripping retaining and advance the control shaft 200 into axial alignment with the clearance portion 222. as shown in FIG. 5*b*.

It is noted that FIGS. 5*a* and 5*b* show the resilient o-ring axially fixed to the control shaft and having an interference or gripping interaction with the sleeve 220. An alternate design may instead incorporate the o-ring in the sleeve element, while the control shaft element includes a gripping portion that has an interference or gripping interaction with the inboard periphery 218 of the o-ring 217 to provide a means to axially retain the control shaft. Further, it is shown that o-ring 216 has a fully circumscribing outboard periphery 217 for a full circumference of gripping interface with the gripping portion 224. Alternatively, such a gripping retaining means may still be achieved with less than a full circumference of gripping interface with the gripping portion 224. For example, a cross drilled control shaft (similar to control shaft 164 of FIG. 3*c*) may be substituted for control shaft 200 with an elastomer plug protruding radially outwardly from the cross drilled hole to provide a similar gripping function as the o-ring 216 of FIG. 5*b*.

Figure 6A:
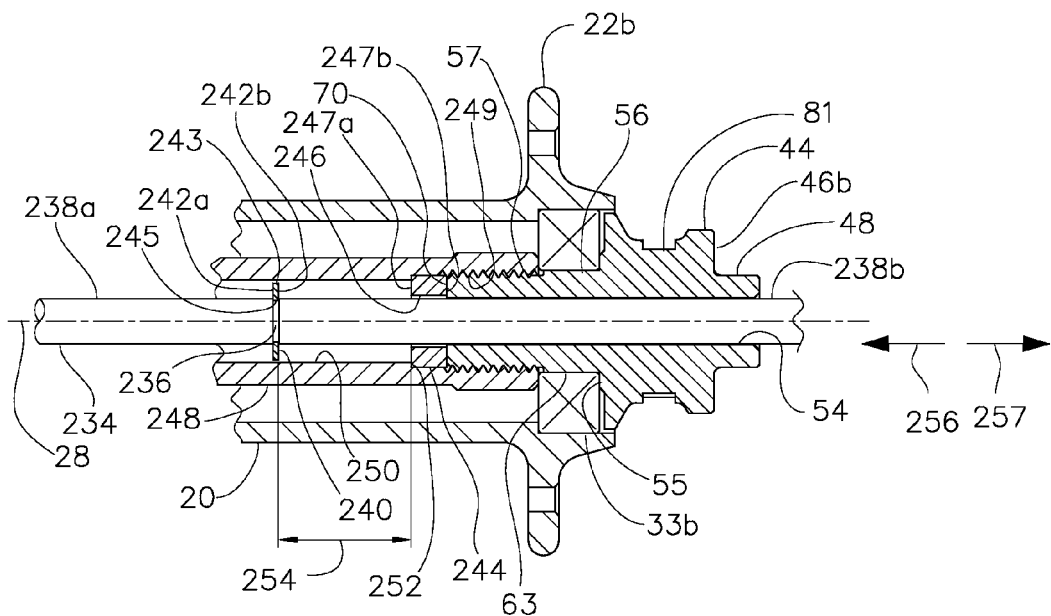
FIG. 6a is an axial cross section detail view, corresponding to the assembly sequence of FIG. 2n, of a fifth embodiment of the present invention, illustrating a magnetic retaining means to axially retain the control shaft to the sleeve, including a magnet and a snapring, and showing the control shaft in the extended position, and with the snapring axially spaced from the magnet to axially release the control shaft.
Figure 6B:
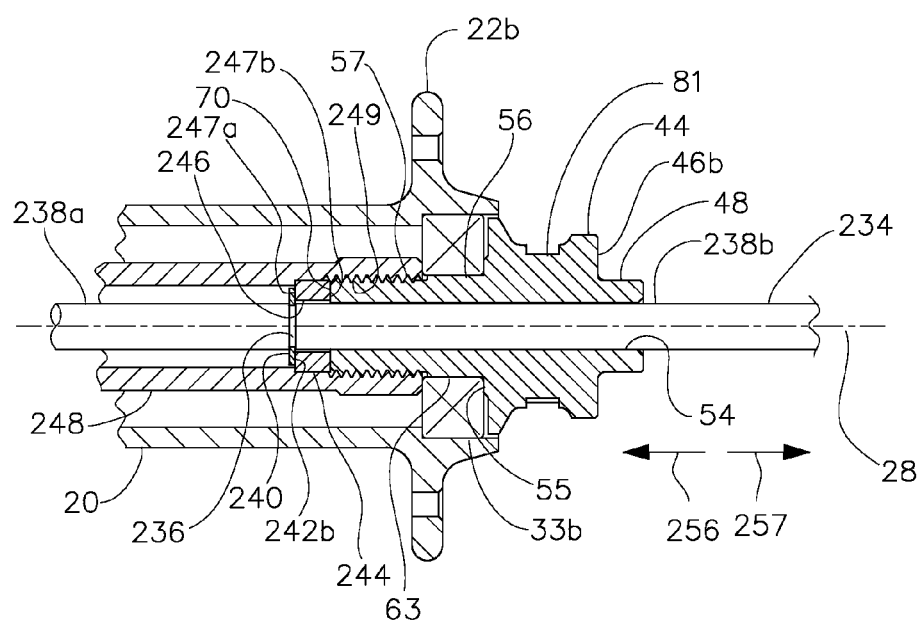
FIG. 6b is an axial cross section detail view, corresponding to the assembly sequence of FIG. 2j, of the embodiment of FIG. 6a, showing the control shaft in the retracted position, with the snapring now contacting the magnet to axially retain the control shaft to the sleeve by means of magnetic attraction force between the magnet and snapring.

As an additional alternative to the spring-loaded linear detent retaining means, the control shaft may include a magnetic retaining means, which utilizes magnetic attraction and/or repulsive forces to retain the control shaft at a given axial position relative to the sleeve. An example of such a magnetic retaining means is illustrated in FIGS. 6*a-b*. Hubshell 20, axlecap 44, and bearing 33*b* are identical to those described in FIGS. 2*a-q*. Control shaft 234 is generally coaxial within sleeve 248 and includes snapring groove 236 and shank portions 238*a* and 238*b*. Snapring 240 is one of a variety of configurations well known in industry and is made of steel material. Snapring 236 includes faces 242a and 242b and preferably has a generally circular outside perimeter 243, with its inside perimeter 245 engaged to the snapring groove 236 in one of a variety of configurations well known in industry. Sleeve 248 includes a central opening 250 extending axially therethrough, with shoulder 252 and internal threads 249 to threadably mate with external threads 57. Magnet 244 is of a hollow cylindrical shape as shown, with an axial hole 246 therethrough and end faces 247a and 247b. The magnet 244 shown here is a permanent magnet, although other magnet types, such as an electromagnet, may alternatively be utilized.

As shown in FIG. 6a, axlecap 44 is threadably assembled to sleeve 248 via threadable engagement between external threads 57 and internal threads 249 such that the magnet 244 is axially captured between shoulder 252 and end face 70, with the outer periphery of face 247a abutting shoulder 252 and face 247b abutting end face 70. Control shaft 234 is shown in FIG. 6a to be in the axially extended position, with face 242b axially separated from magnet 244 by gap 254. Shank portion 238b coaxially extends through central opening 250, hole 246, and hole 54. Since, in the extended position shown in FIG. 6a, snapring 240 is axially separated from magnet 244, the magnet provides negligible axial bias to the control shaft 234 and the control shaft 234 is generally free to move easily in both directions 256 and 257 and to rotate about the axial axis 28. Thus, the control shaft 234 may function to connect with dropouts 32a and 32b as previously described in FIGS. 2a-q. Note that the compression spring 97 of FIGS. 2a-n is omitted in the embodiment of FIGS. 6a-b, providing an example arrangement without such an axial bias to the control shaft 234.

When the control shaft 234 is axially advanced in direction 257, gap 254 will be reduced and the snapring 240 will eventually approach or contact face 247a, such that the magnet 244 and its corresponding magnetic flux will provide an attractive force to the snapring 240. As shown in FIG. 6b, the control shaft 234 has been axially shuttled and advanced in direction 257 until face 242b contacts face 247a. The control shaft 234 is now in its retracted position and the magnetic attraction between the magnet 244 and the snapring 242 now serves to axially retain the control shaft 234 in this retracted position. This magnetic retaining means provides similar function to the spring-loaded detent mechanism and the gripping retaining means previously described herein in that the control shaft 234 is axially retained in the retracted position as a convenience to the operator to allow the hub assembly (i.e. wheel) to be assembled to the dropouts. Once the hub assembly is positioned between the dropouts, the operator may next push the control shaft 234 via the handle (not shown) in direction 256 to override the magnetic retention and advance the control shaft 234 in direction 256 to secure the hub assembly to the dropouts as previously described.

It is noted that the embodiments of FIGS. 2a-q, 3a-d, 4a-b, 5a-b, and 6a-b all describe yieldable axial retaining systems that may be yielded or overridden by simply pushing the control shaft in a direction generally parallel to the axial axis 28. These retaining systems may be considered as passive retaining systems since the operator merely needs to axially displace the control shaft in the desired direction of axial travel to engage the axial retaining means or to release the axial retaining means. No additional activation is required by the operator of this mechanism. As an alternative to such a passive axial retaining system, it is possible to employ an active axial retaining system where the operator must separately activate the axial retaining means. An example of such an active axial retaining system is described in the embodiment of FIGS. 7a-c, which employs a lockable or latching axial retaining means where the operator must separately press the pushbutton in order to release the retaining means.

It is further noted that the retaining systems of FIGS. 2a-q, 3a-d, 4a-b, 5a-b, and 6a-b are considered to have a yieldable retaining means since the retaining means may be yielded or overridden by axially pressing the control shaft to overcome the axial retaining force. This is in contrast to a positive axial retaining means where the control shaft is positively retained and the retaining means may not be overridden in normal use. An example of such positive axial retaining means is the axial retaining provided by snapring 64c of FIGS. 2a-q, which insures that the control shaft assembly 60 remains engaged to the hub assembly 30 and positively prevents the control shaft assembly 60 from being withdrawn in the axial direction 118 beyond the limit provided by snapring 64c. Another example of a positive retaining means is shown in FIG. 7a-c, where the locking pin 265 serves to lockably engage the detent balls 274 and positively prevents the control shaft 261 from axially advancing past the rib 284.

Figure 7A:
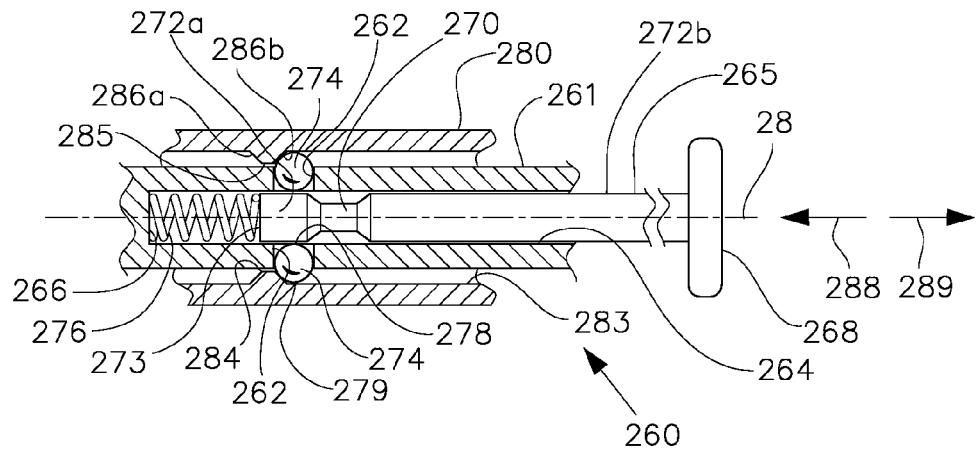
FIG. 7a is an axial cross section detail view, corresponding to the assembly sequence of FIG. 2j, of a sixth embodiment of the present invention, including a locking pin of the control shaft serving to lock the detent balls in the radially outward position to engage the internal rib of the sleeve and to axially engage the control shaft in the retracted position relative to the sleeve.

As shown in FIG. 7a, control shaft 260 constitutes an assembly that includes an external shaft 261, a locking pin 265, a spring 276, and engagement balls 274. External shaft 261 includes radially extending cross holes 262 and an axially extending central bore 264 with bottom 266. Cylindrical locking pin 265 extends within bore 264 and includes a pushbutton 268b, end face 273, and a circumferential groove or necked region 270 that separates shank portions 272a and 272b. Spring 276 extends between bottom 266 and end face 273 and serves to bias the locking pin 265 in direction 289 relative to the external shaft 261. Engagement balls 274 function in a manner similar to detent balls 74 of FIGS. 3a-c and include respective radial inboard peripheries 278 and respective radial outboard peripheries 279 and are positioned within their associated holes 262. Sleeve 280 is similar to sleeve 146 of FIGS. 3a-c and includes a cylindrical internal surface 283 with a circumferential rib 284 extending radially inwardly therefrom. Rib 284 includes radially inboard apex 285 and engagement surfaces 286a and 286b to interface with engagement balls 274.

FIG. 7a corresponds to the assembly sequence described in FIG. 2j and engagement balls 274 are positioned within corresponding holes 262, with their radially spherical inboard periphery 278 contacting the shank portion 272a and with their radially outboard periphery 279 having radial clearance with internal surface 283. The engagement balls 274 are axially retained to the external shaft 261 by holes 262, and the shank portion 272a provides a blocking engagement to prevent engagement balls 272 from moving radially inwardly. Detent balls 274 are radially outwardly extended to protrude and project from external shaft 261. This is considered a locked, retained, and engaged orientation of the control shaft 260, with the outboard periphery 279 having a radial overlie engagement with the engagement surface 286b, serving to axially retain and restrain the control shaft 260 from moving in direction 288 relative to the sleeve 261. Engagement balls 274 are also contacting cam surface 286b of the sleeve 261. The control shaft 261 is thus axially locked and positively restricted from moving in direction 288 relative to the sleeve 261, thereby maintaining the control shaft 260 in its retracted position as shown. A locked axial retaining means is provided that may not be overridden ion normal service. As shown in FIG. 7a, the control shaft 260 may be considered to be in a locked orientation.

Figure 7B:
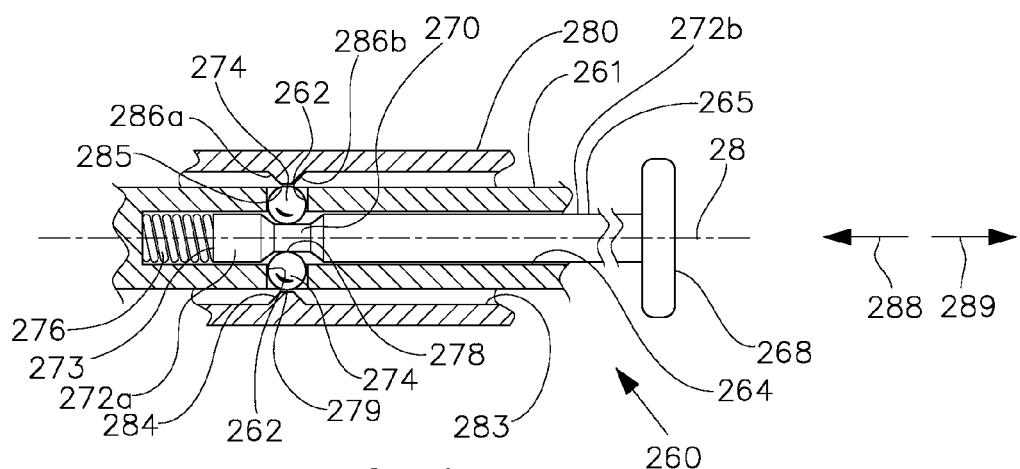
FIG. 7b is an axial cross section detail view, corresponding to the assembly sequence of FIG. 2L, of the embodiment of FIG. 7a, with locking pin of the control shaft serving to radially release the detent balls from axial engagement with the internal rib and release the control shaft to axially advance toward the extended position.
Figure 7C:
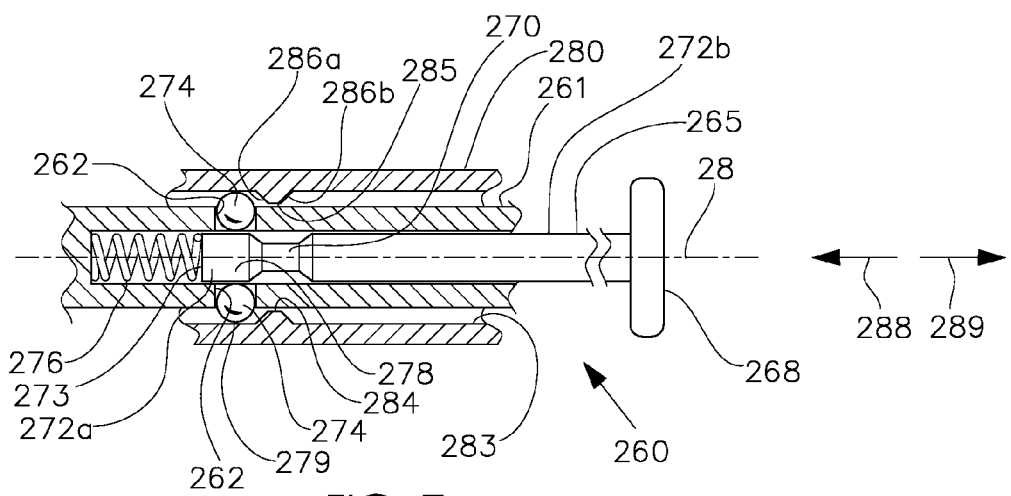
FIG. 7c is an axial cross section detail view, corresponding to the assembly sequence of FIG. 2n, of the embodiment of FIG. 7a, with the detent balls axially advanced past the internal rib to axially release the control shaft.

Next, as shown in FIG. 7b, the operator has depressed pushbutton 268, advancing locking pin 265 in direction 288 relative to the external shaft 261, and compressing spring 276 such that necked portion 270 is now axially aligned with holes 262, which releases engagement balls 274 to move radially inwardly as shown. This is considered a released orientation of the control shaft 260 where the detent balls 274 are also released to be radially inwardly retracted within holes 262. FIG. 7b corresponds to the assembly sequence of FIG. 2L. With engagement balls 274 now positioned radially inwardly, their radially outboard peripheries now have radial clearance with apex 285 and the control shaft 260 is now released to advanced in direction 288 relative to the sleeve 280. FIG. 7b shows the control shaft 260 as axially advanced in direction 288 such that engagement balls 274 are now axially aligned with apex 285. The operator has actively placed the control shaft 260 in the released orientation in order to advance the control shaft 260 in direction 288.

Next, FIG. 7c shows the control shaft 260 as further advanced in direction 288 relative to the sleeve 280. Pushbutton 268 has been released in direction 289 relative to the external shaft 261 and shank portion 272a has returned (via spring 276) to its axially aligned position relative to the engagement balls 274 as described in FIG. 7a. Engagement balls 274 are again locked in their radially outboard position. However, engagement balls 274 have now advanced past the rib 284 and the control shaft 260 is now released and free to advance further in direction 288 relative to the sleeve 261 toward its extended position. The control shaft 260 may later be axially shuttled in direction 289 toward its retracted position, with the control shaft 260 in the released orientation to clear past the rib 284. The control shaft 260 described herein is representative of a wide range of "quick release pins" commercially available in industry.

While my above description contains many specificities, these should not be construed as limitations on the scope of the invention, but rather as exemplifications of embodiments thereof. For example:

The embodiments of FIGS. 2a-q, 3a-d, and 4a-b show a spring-loaded retaining means where the spring (76, 130, 152, 166, 176, 187) that provides the spring-loading or spring-energizing are additional element(s) and/or geometry(s) from the detent balls 74 or projections 177a and 177b that interface with cam surfaces (64a, 156a, 156b, 189a, 189b) to provide the spring-loaded linear detent mechanism described herein. Alternatively, the spring may include geometry to directly interface with the cam surface to provide this the spring-loaded linear detent mechanism. One example of such an alternative arrangement includes an arrangement similar to the conventional garment snap, where the sleeve may include a axially retained wrapped spring (similar in shape to wrapped spring 130) interfaces directly with a circumferential rib (i.e. cam surface) of the control shaft (or vice versa).

The embodiments of FIGS. 2a-q and 6a-b show the axle assembly including a stub 48 that coaxially surrounds the control shaft (61, 234) to provide a convenient shielding external surface to provide the radial locating interface with slot 36b. Alternatively, such a stub or collar may be eliminated and the control shaft (61, 234) may instead serve to provide the radial locating interface directly with slot 36b.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A vehicle wheel hub assembly, comprising:
   an axle element that is rotationally stationary about an axial axis;
   a hub shell element that is rotatable about said axle element and about said axial axis, including a first end portion and a second end portion axially spaced from said first end portion;
   a control shaft that is internally coaxial with said axle element and axially displaceable relative to said axle element between an axially extended position and an axially retracted position, wherein said axial displacement is in a retracting direction toward said retracted position and an extending direction opposed to said retracting direction and toward said extended position;
   wherein said control shaft includes an engagement end and a control end axially opposed said engagement end, wherein said control shaft may be manipulated adjacent said control end;
   wherein, in said extended position, said engagement end is axially outward relative to said retracted position;
   including a releasable axial retaining means between said control shaft and said axle element at a retaining interface to restrain the axial displacement of said control shaft relative to said axle element;
   wherein said retaining means may be selectively released to permit said axial displacement of said control shaft relative to said axle element; and
   wherein, when said axial retaining means is released, the axial displacement of said control shaft may be manipulated independently of a circumferential displacement of said control shaft relative to said axle element.

2. A vehicle wheel hub assembly according to claim 1, wherein said axle element has a first outer face and a second outer face, wherein said first outer face is axially proximal said first end portion and said second outer face is axially proximal said second end portion and axially distal said first end portion relative to said first outer face, and wherein, in said retracted orientation, said engagement end is one of axially flush and axially recessed relative to said first outer face.

3. A vehicle wheel hub assembly according to claim 1, wherein said axle element includes an axially extending opening therein to receive said control shaft, and wherein said control shaft is piloted within said opening of said axle element for radial location control between said control shaft and said axle element.

4. A vehicle wheel hub assembly according to claim 1, wherein said control shaft is positively axially retained to said hub assembly to restrict separation between said control shaft and said hub assembly.

5. A vehicle wheel hub assembly according to claim 1, wherein said axial retaining means serves to axially retain said control shaft at a predetermined axial position or within a predetermined axial positional range relative to said hub shell element.

6. A vehicle wheel hub assembly according to claim 5, wherein said predetermined axial position or said predetermined axial positional range is adjacent said retracted position and axially distal said extended position.

7. A vehicle wheel hub assembly according to claim 1, wherein said axial retaining means may be manually manipulated between (i) a retained orientation to provide said axial retaining means and (ii) a released orientation to provide said release of said axial retaining means.

8. A vehicle wheel hub assembly according to claim 1, wherein said axial retaining means is a passive axial retaining means.

9. A vehicle wheel hub assembly according to claim 8, wherein said axial retaining means is a linear detent mechanism.

10. A vehicle wheel hub assembly according to claim 9, wherein said elastic spring element is a circumferential elastic spring element.

11. A vehicle wheel hub assembly according to claim 9, wherein said linear detent mechanism is a spring-loaded linear detent mechanism, including an elastic spring element of said control shaft to provide a radially outward bias to energize said spring-loaded linear detent mechanism.

12. A vehicle wheel hub assembly according to claim 11, wherein said spring-loaded axial retaining means includes an axially fixed cam surface of said axle element and a generally radially displaceable follower surface axially retained to said control shaft.

13. A vehicle wheel hub assembly according to claim 9, wherein said spring-loaded axial retaining means includes an axially fixed cam surface of said control shaft and a radially displaceable follower surface axially retained to said axle element.

14. A vehicle wheel hub assembly according to claim 1, wherein said axial retaining means is an active axial retaining means that is at least one of: (i) actively actuated to initiate said axial retaining means; and (ii) actively released to provide said selective release and permit the axial displacement of said control shaft.

15. A vehicle wheel hub assembly according to claim 14, wherein said active retaining means includes a radially extending engagement projection that may be manually manipulated between a radially extended position and a radially retracted position; wherein, in said radially extended position, said engagement projection provide a radially overlapping overlie engagement to provide said axial retaining means; and wherein, in said radially retracted position, said overlie engagement is released to provide said release of said axial retaining means.

16. A vehicle wheel hub assembly according to claim 14, wherein said axial retaining means is at least one of a locking and a latching axial retaining means, including a means to actively release said axial retaining means.

17. A vehicle wheel hub assembly according to claim 1, wherein said axial retaining means is a yieldable axial retaining means.

18. A vehicle wheel hub assembly according to claim 1, wherein said axial retaining means is a gripping retaining means, including a gripping interface to provide said gripping retaining means.

19. A vehicle wheel hub assembly according to claim 18, wherein said gripping interface is a circumferential gripping interface that is circumferential about said axial axis.

20. A vehicle wheel hub assembly according to claim 18, wherein said gripping interface includes a resilient elastomeric gripping surface axially retained to at least one of said control shaft and said axle element.

21. A vehicle wheel hub assembly according to claim 1, wherein said axial retaining means is a magnetic retaining means, including a magnetic force to provide said magnetic retaining means.

22. A vehicle wheel hub assembly according to claim 21, wherein said magnetic force is provided, at least in part, by a permanent magnet axially retained to one of said control shaft and said axle element.

23. A vehicle wheel hub assembly according to claim 22, wherein said permanent magnet coaxially surrounds said control shaft about said axial axis.

24. A vehicle wheel hub assembly according to claim 1, including a handle connected to said control shaft, wherein said handle facilitates manual manipulation of said control shaft.

25. A vehicle wheel hub assembly according to claim 1, including a means to axially bias said control shaft toward one of said axially extended orientation and said axially retracted orientation.

26. A vehicle wheel hub assembly according to claim 25, wherein said means to bias serves to bias said control shaft toward said axially extended orientation.

27. A vehicle wheel hub assembly according to claim 25, wherein said means to bias is a spring.

28. A vehicle wheel hub assembly according to claim 1, including a frame, wherein said control shaft is radially engaged to said frame in said extended position and is radially disengaged from said frame in said retracted position.

29. A vehicle wheel hub assembly according to claim 1, including a frame, wherein said engagement end is radially engaged to said frame in said extended position and is radially disengaged from said frame in said retracted position, and where said control shaft includes a grip face and wherein said grip face serves to axially clamp said axle element to said frame.

30. A vehicle wheel hub assembly according to claim 1, wherein said axial retaining means serves to at least one of (i) restrain said axial displacement of said control shaft from reaching said extended position in said extending direction, and (ii) restrain said axial displacement of said control shaft from reaching said retracted position in said retracting direction.

31. A vehicle wheel hub assembly according to claim 30, wherein said axial retaining means serves to restrain the axial displacement of said control shaft in a first axial direction without restraining the axial displacement of said control shaft in a second axial direction axially opposed to said first axial direction.

32. A vehicle wheel hub assembly according to claim 30, wherein, with said control shaft in said retracted position, said axial retaining means serves to restrain said axial displacement of said control shaft in said extending direction.

33. A vehicle wheel hub assembly according to claim 1, wherein, upon said selective release of said axial retaining means, said axial retaining means does not bind or restrict the free axial displacement of said control shaft relative to said axle element.

34. A vehicle wheel hub assembly, comprising:
an axle element that is rotationally stationary about an axial axis;
a hub shell element that is rotatable about said axle element and about said axial axis, including a first end portion and a second end portion axially spaced from said first end portion;
a control shaft that is internally coaxial with said axle element and axially displaceable relative to said axle element between an axially extended position and an axially retracted position, wherein said axial displacement is in a retracting direction toward said retracted position and an extending direction opposed to said retracting direction and toward said extended position;

wherein said control shaft includes an engagement end and a control end axially opposed said engagement end, wherein said control shaft may be manipulated adjacent said control end;

wherein, in said extended position, said engagement end is axially outward relative to said retracted position;

including a releasable axial retaining means between said control shaft and said axle element at a retaining interface to restrain the axial displacement of said control shaft relative to said axle element;

wherein said axial retaining means may be selectively released to permit said axial displacement of said control shaft relative to said axle element;

wherein said axial retaining means is a passive axial retaining means;

wherein said axial retaining means is a linear detent mechanism; and wherein said linear detent mechanism is a spring-loaded linear detent mechanism, including an elastic spring element of said axle element to provide a radially inward bias to energize said spring-loaded linear detent mechanism.

35. A vehicle wheel hub assembly, comprising:

an axle element that is rotationally stationary about an axial axis;

a hub shell element that is rotatable about said axle element and about said axial axis, including a first end portion and a second end portion axially spaced from said first end portion;

a control shaft that is internally coaxial with said axle element and axially displaceable relative to said axle element between an axially extended position and an axially retracted position, wherein said axial displacement is in a retracting direction toward said retracted position and an extending direction opposed to said retracting direction and toward said extended position;

wherein said control shaft includes an engagement end and a control end axially opposed said engagement end, wherein said control shaft may be manipulated adjacent said control end;

wherein, in said extended position, said engagement end is axially outward relative to said retracted position;

including a releasable axial retaining means between said control shaft and said axle element at a retaining interface to restrain the axial displacement of said control shaft relative to said axle element;

wherein said axial retaining means may be selectively released to permit said axial displacement of said control shaft relative to said axle element; and wherein, when said axial retaining means is released, said axial retaining means does not impede the rotation of said control shaft relative to said axle element about said axial axis.

36. A vehicle wheel hub assembly, comprising:

an axle element that is rotationally stationary about an axial axis;

a hub shell element that is rotatable about said axle element and about said axial axis, including a first end portion and a second end portion axially spaced from said first end portion;

a control shaft that is internally coaxial with said axle element and axially displaceable relative to said axle element between an axially extended position and an axially retracted position, wherein said axial displacement is in a retracting direction toward said retracted position and an extending direction opposed to said retracting direction and toward said extended position;

wherein said control shaft includes an engagement end and a control end axially opposed said engagement end, wherein said control shaft may be manipulated adjacent said control end;

wherein, in said extended position, said engagement end is axially outward relative to said retracted position;

including a releasable axial retaining means between said control shaft and said axle element at a retaining interface to restrain the axial displacement of said control shaft relative to said axle element;

wherein said axial retaining means may be selectively released to permit said axial displacement of said control shaft relative to said axle element;

wherein said axial retaining means is a passive axial retaining means;

wherein said axial retaining means is a linear detent mechanism; and wherein said linear detent mechanism includes a radially overlapping overlie engagement between a radially inwardly projecting engagement surface of said axle element and a radially outwardly projecting engagement surface of said control shaft, wherein at least one of said radially inwardly projecting engagement surface and said radially outwardly projecting engagement surface is a displaceable surface that is radially displaceable between an engagement orientation associated with said radially overlapping overlie engagement and with said axial retaining means and a released orientation associated with said selective release of said axial retaining means.

37. A vehicle wheel hub assembly according to claim 36, wherein at least one of said radially inwardly projecting surface and said radially outwardly projecting surface is radially fixed, and wherein said one of (i) said radially fixed and said radially inwardly projecting surface of said axle element or (ii) said radially fixed and said radially outwardly projecting surface of said control shaft is a peaked projecting surface, with radially relieved surfaces both axially inboard and axially outboard of said peaked projecting surface and axially adjacent thereto.

38. A vehicle wheel hub assembly according to claim 36, wherein said displaceable surface includes a radially extended position corresponding to said overlie engagement and a radially retracted position corresponding to said release of said overlie engagement, including a generally radial displacement between said radially extended position and said radially retracted position, and including an elastically deformable resilient means to bias said displaceable surface toward said radially extended position, wherein the deformation of said resilient means is increased in said radially retracted position and is reduced in said radially extended position.

39. A vehicle wheel hub assembly according to claim 38, wherein said resilient means is a resilient element discreet from said radially displaceable surface.

40. A vehicle wheel hub assembly according to claim 39, wherein said radially displaceable surface is associated with a generally rigid element that is not deformed in operation.

41. A vehicle wheel hub assembly according to claim 39, wherein said resilient element is a circumferentially wrapping elastic element.

42. A vehicle wheel hub assembly according to claim 39, wherein said resilient element is an elastomeric element.

43. A vehicle wheel hub assembly, comprising:
- an axle element that is rotationally stationary about an axial axis;
- a hub shell element that is rotatable about said axle element and about said axial axis, including a first end portion and a second end portion axially spaced from said first end portion;
- a control shaft that is internally coaxial with said axle element and axially displaceable relative to said axle element between an axially extended position and an axially retracted position, wherein said axial displacement is in a retracting direction toward said retracted position and an extending direction opposed to said retracting direction and toward said extended position;
- wherein said control shaft includes an engagement end and a control end axially opposed said engagement end, wherein said control shaft may be manipulated adjacent said control end;
- wherein, in said extended position, said engagement end is axially outward relative to said retracted position;
- including a releasable axial retaining means between said control shaft and said axle element at a retaining interface to restrain the axial displacement of said control shaft relative to said axle element;
- wherein said axial retaining means may be selectively released to permit said axial displacement of said control shaft relative to said axle element; and
- wherein said axial displacement is a linear shuttled axial displacement, wherein said selective release may be achieved with non-rotational axial displacement of said control shaft relative to said axle element.

* * * * *